US011209806B2

(12) United States Patent
Jones et al.

(10) Patent No.: US 11,209,806 B2
(45) Date of Patent: Dec. 28, 2021

(54) ASSISTANT APPLICATION FOR A MODULAR CONTROL SYSTEM

(71) Applicant: FISHER-ROSEMOUNT SYSTEMS, INC., Round Rock, TX (US)

(72) Inventors: Aaron C. Jones, Round Rock, TX (US); Michael G. Ott, Round Rock, TX (US); Julian K. Naidoo, Cedar Park, TX (US); Deborah R. Colclazier, Round Rock, TX (US); Karen Johnson, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 470 days.

(21) Appl. No.: 16/130,700

(22) Filed: Sep. 13, 2018

(65) Prior Publication Data
US 2019/0079507 A1 Mar. 14, 2019

Related U.S. Application Data

(60) Provisional application No. 62/567,225, filed on Oct. 2, 2017, provisional application No. 62/558,345, filed on Sep. 13, 2017.

(51) Int. Cl.
*G06F 9/44* (2018.01)
*G05B 23/02* (2006.01)
(Continued)

(52) U.S. Cl.
CPC ..... *G05B 23/0216* (2013.01); *G05B 19/0426* (2013.01); *G05B 23/0213* (2013.01);
(Continued)

(58) Field of Classification Search
CPC ....................................................... G06F 9/44
See application file for complete search history.

(56) References Cited

U.S. PATENT DOCUMENTS

| 4,517,637 A | 5/1985 | Cassell |
| 6,873,961 B1 * | 3/2005 | Thorpe ................. G06Q 10/10 |
| | | 705/7.38 |

(Continued)

FOREIGN PATENT DOCUMENTS

| DE | 10 2010 040 054 A1 | 3/2012 |
| GB | 2 420 423 A | 5/2006 |

(Continued)

OTHER PUBLICATIONS

Search Report for Application No. GB1717423.6, dated Apr. 19, 2018.

(Continued)

*Primary Examiner* — Jae U Jeon
(74) *Attorney, Agent, or Firm* — Marshall, Gerstein & Borun LLP

(57) ABSTRACT

A method for efficiently managing configuration of modular control systems includes Detecting a communicative coupling between a workstation and a modular control system, determining whether an active project stored in a memory of the workstation matches a saved project stored in a memory of the modular control system, where each of the active project and the saved project includes a respective coordinated set of data for controlling operation of the modular control system, and when the active project and the saved project do not match, (i) determining whether the active project is correct for the modular control system, and (ii) when the active project is incorrect the modular control system, automatically providing, via an interactive user interface, a control for transferring at least a portion of the saved project from the memory of the modular control system to the active project in the memory of the workstation.

25 Claims, 37 Drawing Sheets

(51) Int. Cl.
  *G06F 3/0482* (2013.01)
  *G06F 3/0484* (2013.01)
  *G05B 19/042* (2006.01)
  *G06F 8/71* (2018.01)
  *G06F 8/65* (2018.01)

(52) U.S. Cl.
  CPC ........ *G06F 3/0482* (2013.01); *G06F 3/04847* (2013.01); *G06F 8/65* (2013.01); *G06F 8/71* (2013.01)

(56) References Cited

U.S. PATENT DOCUMENTS

| | | | |
|---|---|---|---|
| 7,020,876 | B1 | 3/2006 | Deitz et al. |
| 7,127,707 | B1* | 10/2006 | Mishra .................... G06F 8/423 717/137 |
| 7,181,550 | B2 | 2/2007 | Shepard et al. |
| 7,933,950 | B1* | 4/2011 | Barton ................. H04N 21/812 709/203 |
| 8,839,265 | B2 | 9/2014 | Jacobson et al. |
| 9,792,004 | B2 | 10/2017 | Hammack et al. |
| 9,830,216 | B2 | 11/2017 | Nguyen |
| 10,778,330 | B1* | 9/2020 | Zoller ................... H04B 10/516 |
| 2003/0055828 | A1* | 3/2003 | Koch ..................... G06F 16/178 |
| 2004/0225964 | A1* | 11/2004 | Simonyi .................... G06F 8/71 715/256 |
| 2008/0040655 | A1* | 2/2008 | Tanaka ............... G06K 9/00449 715/228 |
| 2008/0081579 | A1 | 4/2008 | Chen et al. |
| 2008/0140870 | A1 | 6/2008 | Meyer et al. |
| 2011/0055891 | A1* | 3/2011 | Rice .................... G06F 21/6218 726/2 |
| 2011/0301725 | A1 | 12/2011 | Kline, Jr. |
| 2012/0029661 | A1 | 2/2012 | Jones et al. |
| 2012/0116541 | A1* | 5/2012 | Reusch ............ G05B 19/41865 700/7 |
| 2012/0254339 | A1 | 10/2012 | Holmes |
| 2012/0296448 | A1 | 11/2012 | Balentine et al. |
| 2014/0244329 | A1* | 8/2014 | Urban ............ G06Q 10/063114 705/7.15 |
| 2014/0317005 | A1* | 10/2014 | Balwani ................. B65D 81/18 705/317 |
| 2015/0082224 | A1* | 3/2015 | Hathaway ............... G06F 9/451 715/771 |
| 2015/0089021 | A1* | 3/2015 | Bergbauer ........... G06Q 10/101 709/217 |
| 2015/0112469 | A1* | 4/2015 | Da Silva Neto . G05B 19/41855 700/108 |
| 2015/0113662 | A1 | 4/2015 | Muller |
| 2015/0338837 | A1 | 11/2015 | Wagener et al. |
| 2016/0320762 | A1 | 11/2016 | Lutz et al. |
| 2016/0359866 | A1 | 12/2016 | Mixer |
| 2018/0052683 | A1 | 2/2018 | Iguchi |
| 2018/0059629 | A1* | 3/2018 | Haridas ............... G05B 19/4155 |

FOREIGN PATENT DOCUMENTS

| | | |
|---|---|---|
| JP | S63-301337 A | 12/1988 |
| JP | 2004-038930 A | 2/2004 |
| JP | 2008-282362 A | 11/2008 |
| JP | 2011-181085 A | 9/2011 |
| JP | 2013-521578 A | 6/2013 |
| JP | 2016-504640 A | 2/2016 |
| JP | 2016-129012 A | 7/2016 |
| WO | WO-2016/151856 A1 | 9/2016 |

OTHER PUBLICATIONS

Search Report for Application No. GB1814880.9, dated Mar. 8, 2019.
Notice of Reason for Rejection for Japanese Application No. 2017-205481, dated Jul. 6, 2021.
Examination Report for Application No. GB1717423.6, dated Oct. 13, 2021.

* cited by examiner

PK Assistant

Connect

Status:
⚙ Active project contains configuration that's older than the backup Compare/Retrieve configuration items from the backup — 380
▼ Conflicting items Group by: [No grouping ▼]

| ☐ Retrieve | Name | Configuration Type | Item Type | Modified | Modified(in last backup) | Comparison |
|---|---|---|---|---|---|---|
| ☐ | FIC-1 | Logic | Control M... | 22-Jul-2016 12:43:14 AM | 21-Jul-2016 11:15:16 AM | AP newer |
| ☐ | FT-1 | Field Devices | Transmitter | 21-Jul-2016 11:16:17 AM | 21-Jul-2016 11:16:17 AM | Backup newer |
| ☐ | Cent1 | Graphics | Display | 22-Jul-2016 07:45:34 PM | 23-Jul-2016 12:11:14 PM | Dual change |

▼ Items in the controller's backup but not in the active project

Group by: [No grouping ▼]

| ☐ Retrieve | Name | Configuration Type | Item Type | Modified |
|---|---|---|---|---|
| ☐ | XIC-1 | Logic | Control M... | 22-Jul-2016 11:45:35 AM |
| ☐ | HEADER1 | Logic | Equipment... | 23-Jul-2016 12:34:27 PM |

△ Items in the active project but not in the controller's backup

[Refresh data] [Retrieve] [Cancel]

*FIG. 9B*

PK Assistant

Connect

Status:
⚡ Active project contains configuration items from the backup

Compare/Retrieve configuration items from the backup
▼ Conflicting items

Group by: [No grouping ▼]

| Retrieve | Name | Configuration Type | Item Type | Modified | Modified(in last backup) | Modified | Comparison |
|---|---|---|---|---|---|---|---|
| ☐ | FIC-1 | Logic | Control M... | 22-Jul-2016 12:43:14 AM | 21-Jul-2016 11:15:16 AM | 21-Jul-2016 11:15:16 AM | AP newer |
| ☑ | FT-1 | Field Devices | Transmitter | 21-Jul-2016 11:16:17 AM | 21-Jul-2016 11:16:17 AM | 22-Jul-2016 12:11:14 PM | Backup newer |
| ☐ | Cent1 | Graphics | Display | 22-Jul-2016 07:45:34 PM | 21-Jul-2016 11:18:17 AM | 23-Jul-2016 12:11:14 PM | Dual change |

◀ Items in the controller's backup but not in the active project

Group by: [No grouping ▼]

| Retrieve | Name | Configuration Type | Item Type | Modified |
|---|---|---|---|---|
| ☑ | XIC-1 | Logic | Control M... | 22-Jul-2016 11:45:35 AM |
| ☑ | HEADER1 | Logic | Equipment... | 23-Jul-2016 12:34:27 PM |

△ Items in the active project but not in the controller's backup

Retrieving items : 2 of 3

[Show details]    [Refresh data]   [Retrieve]   [Cancel]

*FIG. 9D*

PK Assistant

Connect

Status:
⇆ Active project contains configuration that's older than the backup

Compare/Retrieve configuration items from the backup
▼ Conflicting items

Group by: [No grouping ▼]

| ☐ Retrieve | Name | Configuration Type | Item Type | Modified | Modified(in last backup) | Comparison |
|---|---|---|---|---|---|---|
| ☐ | FIC-1 | Logic | Control M... | 22-Jul-2016 12:43:14 AM | 21-Jul-2016 11:15:16 AM | AP newer |
| ☑ | FT-1 | Field Devices | Transmitter | 21-Jul-2016 11:16:17 AM | 21-Jul-2016 11:16:17 AM | Backup newer |
| ☐ | Cent1 | Graphics | Display | 22-Jul-2016 07:45:34 PM | 23-Jul-2016 12:11:14 PM | Dual change |

▲ Items in the controller's backup but not in the active project

Group by: [No grouping ▼]

| ☑ Retrieve | Name | Configuration Type | Item Type | Modified |
|---|---|---|---|---|
| ☑ | XIC-1 | Logic | Control M... | 22-Jul-2016 11:45:35 AM |
| ☑ | HEADER1 | Logic | Equipment... | 23-Jul-2016 12:34:27 PM |

▷ Items in the active project but not in the controller's backup

[progress bar]

Retrieving items : 2 of 3
Started: 24-Jul-2016 8:02:51 AM
FT-1 Transmitter     Done
XIC-1 Control Module  *Failed – item is locked for editing*

[Hide details]     [Refresh data]  [Retrieve]  [Cancel]

*FIG. 9E*

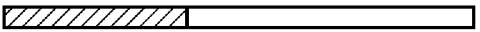
FIG. 13C
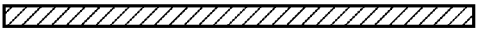
FIG. 13D
FIG. 13E

FIG. 19

ASSISTANT APPLICATION FOR A MODULAR CONTROL SYSTEM

CROSS-REFERENCE TO RELATED APPLICATIONS

This application claims priority to provisional U.S. application Ser. Nos. 62/558,345 and 62/567,225 filed on Sep. 13, 2017 and Oct. 2, 2017, respectively, the entire disclosures of which are hereby expressly incorporated by reference herein.

FIELD OF THE TECHNOLOGY

This disclosure relates generally to using modular control systems such as skid-mounted systems in process control, in particular, to efficiently managing configuration of skid-mounted systems operating in standalone mode.

BACKGROUND INFORMATION

Modular control systems, used today in a variety of industries, are complete control systems that can provide specific functionality, such as boiling water, filtering liquids, or controlling heat exchange. A modular control system typically is implemented as a skid-mounted system, or simply "skid," so called because the system is enclosed within a frame and is easily transported. A skid can be delivered to a factory as an integral unit, without being disassembled and reassembled, and typically preconfigured by the manufacturer. A skid generally includes a programmable logic controller (PLC), specialized equipment such as valves or boilers, and sensors such as pressure or temperature sensors, for example.

On the other hand, distributed control systems (DCS) also are used in a variety of process industries including chemical, petrochemical, refining, pharmaceutical, food and beverage, power, cement, water and wastewater, oil and gas, pulp and paper, and steel, and are used to control batch, fed-batch, and continuous processes operating at a single site or at remote locations. Process plants typically include one or more process controllers communicatively coupled to one or more field devices via analog, digital or combined analog/digital buses, or via a wireless communication link or network. Collectively, the various devices perform monitoring, control, and data collection functions to control the process, safety shutdown systems, fire and gas detection systems, machine health monitoring systems, maintenance systems, decision support, and other systems.

The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration engineer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Devices operating in process control and industrial automation systems can be interconnected in a wired or wireless manner, and communicate using industrial communication protocols such as FOUNDATION™ Fieldbus, HART®, or Profibus. Further, protocols such as Modbus have been developed to interconnect PLCs. Still further, in addition to standard industrial automation protocols there exist proprietary protocols for interconnecting nodes in a process control system. DeltaV is an example of one such protocol. In general, these protocols specify formats for conveying measurements, alerts and status reports, commands that affect process variables or automation parameters, commands for activating or deactivating devices, etc. A typical industrial communication protocol also supports device configuration, via pre-defined commands or commands defined by manufacturers for specific devices in accordance with the syntax of the protocol.

In general, distributed control systems are very complex and feature-rich. Storage and deployment typically is decoupled in a DCS, and multiple databases can store configuration data, which may not have a shared access point. In contrast to a DCS, a PLC typically has simple software, limited features, and very simple project storage, often tightly coupled to runtime deployment. Further, s PLC device typically stores runtime and configuration data on the device itself.

While more robust than a traditional PLC, the modular control system generally does not include as many features as a DCS, and not as many databases and software applications may be available for managing the modular control system. In those situations where a modular control system operates in a standalone mode, rather than as a node of a DCS, engineers may wish to have access to features similar to those available in a DCS, without the complexity of complex software suites or multiple databases.

SUMMARY

A modular control system of this disclosure, such as a skid-mounted system, is configured to operate in a standalone mode and, in some cases, as a node in a distributed control system. The modular control system includes a modular controller capable of executing the control logic of the modular control system independently of other controllers. When the modular control system operates in a standalone mode, an operator can access the modular control system using a workstation implemented on a computing device such as a laptop computer or a tablet computer, for example. An assistant software application, referred below as a skid assistant or modular assistant, facilitates configuration and management of the modular control system. In various implementations and/or scenarios, the modular assistant allows the operator to update modular control system configuration, check for synchronization of the configuration with a certain version, retrieve a configuration for modification or copying, determine whether a configuration includes errors, etc. In some implementations, the assistant software application controls the timing of providing a new configuration to a modular control system so as to reduce the frequency at which the modular controller accesses the memory of the modular control system, which in some implementations is relatively slow. In other implementations, the assistant software application provides configuration data to the modular control system immediately, e.g., substantially in real time.

The skid assistant can provide multiple levels of communicative coupling between the workstation and the modular control system or, more generally, a node of a control system. In an example implementation, the skid assistant checks whether the coupling correct is at connection stage, when a connection at the physical layer is detected, subsequently checks the coupling again at the authentication stage to determine whether the operator is properly authorized to interact with the modular control system, and then again at a project verification stage to determine whether the active project is correct for the modular control system. In this manner, the skid assistant prevents erroneous back-up of an active project to a removable memory card or another type of a suitable memory of the modular control system. Further, the skid assistant prevents erroneous communications between a distributed control system and the modular control system using protocols of a distributed control system and otherwise to exchange information used by a distributed control system. For example, the skid assistant can prevent downloading of wrong configuration to the nodes of the modular control system or displaying wrong runtime information for the nodes of the modular control system via the workstation.

One example embodiment of these techniques is a method for efficiently managing configuration of modular control systems. The method comprises detecting, by one or more processors, a communicative coupling between a workstation and a modular control system; in response to the detected communicative coupling, determining whether an active project stored in a memory of the workstation matches a saved project stored in a memory of the modular control system, where each of the active project and the saved project includes a respective coordinated set of data for controlling operation of the modular control system; and when the active project and the saved project do not match, determining whether the active project is correct for the modular control system and, when the active project is incorrect the modular control system, automatically providing, via an interactive user interface, a control for transferring at least a portion of the saved project from the memory of the modular control system to the active project in the memory of the workstation.

Another example embodiment of these techniques is a computing device comprising one or more processors, a user interface, an interface to communicatively couple the computing device to a modular control system, and a non-transitory memory. The memory stores at least one active project that includes a coordinated set of data for controlling operation of a modular control system. The memory also stores instructions that, when executed by the one or more processors, implement a modular control system assistant configured to (i) detect a communicative coupling between the computing device and a modular control system, (ii) determine whether the active project matches a saved project stored in a memory of the modular control system, (iii) when the active project and the saved project do not match: determine whether the active project is correct for the modular control system, and when the active project is incorrect the modular control system, automatically provide, via the user interface, a control for transferring at least a portion of the saved project from the memory of the modular control system to the active project in the memory of the computing device.

Yet another example embodiment of these techniques is a system comprising a modular control system and a standalone workstation. The modular control system includes a modular controller that implements control logic of the modular control system, where the controller is built natively on a platform of a distributed control system, equipment configured to perform a physical function in a process plant according to the control logic, and a memory storing a saved project that includes a coordinated set of data for controlling operation of the modular control system. The standalone workstation includes one or more processors, a user interface, an interface to communicatively couple the standalone workstation to the modular control system, and a non-transitory memory storing (i) at least one active project and (ii) instructions that, when executed by the one or more processors, implement a modular control system assistant configured to synchronize data between the at least one active project in the memory of the standalone workstation and the saved project in the memory of the modular controls system.

BRIEF DESCRIPTION OF THE DRAWINGS

FIGS. 9A-E illustrate an example sequence of interactive screens which the assistant application of FIG. 1 can present to an operator when the operator connects to a commissioned modular control system;

FIGS. 13A-E illustrate an example sequence of interactive screens which the assistant application of FIG. 1 can present to an operator when the operator creates a new project;

FIG. 19 illustrates an example interactive screen which the assistant application of FIG. 1 can present to an operator when the operator compares and retrieves an active project from a drive;

DETAILED DESCRIPTION

Figure 1:
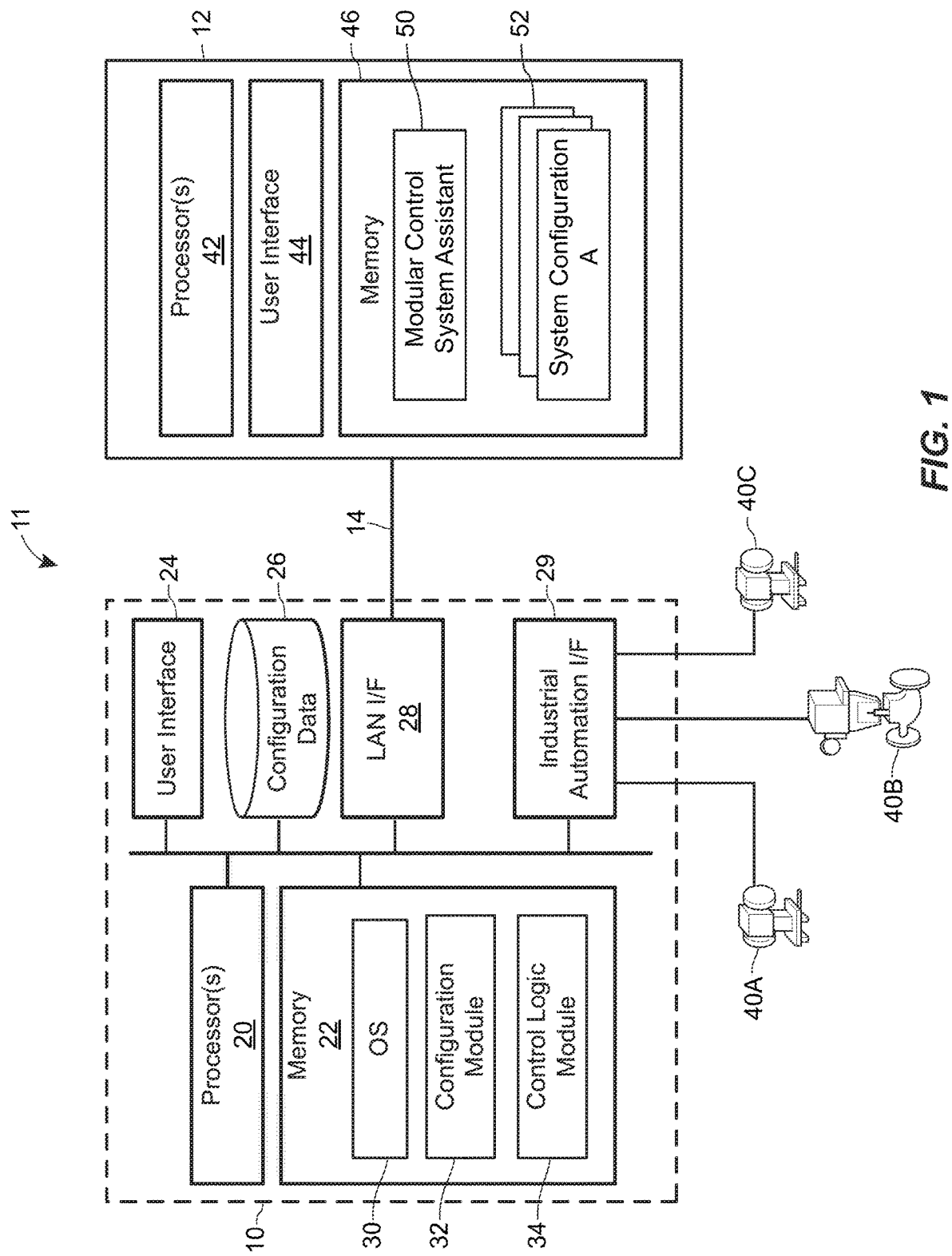
FIG. 1 is a block diagram of a modular control system configured to operate in a standalone mode, and a computer operating as an engineering station executing an assistant application configured to manage configuration of the modular control system.

FIG. 1 illustrates an example a modular controller 10, which may operate in a skid-mounted system, coupled to a computer 12 via an Ethernet connection 14. The modular controller 10 includes one or more processors 20, for example, which can include general-purpose (e.g., CPU, GPU) or special-purpose (e.g., ASIC, FPGA) hardware. The one or more processors 20 are coupled to a memory module 22, a user interface 24, a local configuration database 26, a local area network interface 28, and an industrial automation interface 29.

The memory 22 stores an operating system 30. In some implementations, the operating system 30 is a real-time operating system such as QNX that allows the modular controller 10 to concurrently execute multiple services and applications. For example, a configuration module 32 can execute concurrently with a control logic module 34. The configuration module 32 can receive configuration data from the computer 12, store the received configuration data in the local configuration database 26, etc. as well as retrieve data from the local configuration database 26, provide the retrieved data to the computer 12, etc., without requiring that the modular control system 11 be taken offline. The control logic module 34 may continue to execute control logic by sending commands to field devices 40A-C and receiving data from the field devices 40A-C. The modular controller 10 along with the field devices 40A-C implement a modular control system 11.

A memory card 23 can be coupled to the modular controller 10 in a removable manner. The memory 23 can be an secure digital (SD) card, for example. In some implementations, the memory 23 can store a backup version of the active project (which includes various configuration data, as discussed below). More generally, the modular controller 10 can include any suitable type of a removable memory.

The user interface 24 may be a panel that allows an operator to view the status of the modular controller 10 and/or the field devices 40A-C. The panel may be a touchscreen disposed within the housing of the modular controller 10.

The configuration database 26 may be implemented in the memory module 22 or in a separate module. In some implementations, the memory module in which the configuration database 26 is implemented is flash memory. The configuration database 26 can be implemented as a relatively small set of tables or as a more robust relational database that supports SQL queries, for example.

The LAN interface may be a wired Ethernet interface. In some implementations, the LAN interface does not support wireless communications for enhanced security. The industrial automation interface 28 can support such protocols as Profibus, Modbus, HART, etc.

In some scenarios, as discussed below with reference to FIG. 4, a modular control system of this disclosure such as the system 11 can be integrated into a process control system built on a platform different from that used by the process control system. The platform of the modular control system is some cases may be proprietary. In this case, the modular controller can communicate with the nodes of the process control system using an Open Platform Communication (OPC) communication protocol or a standard protocol such as Modbus.

The computer 12 can be a laptop computer, a tablet computer, a handheld special-purpose electronic device, etc. The computer 12 can include one or more processors 42, a user interface 44, and a memory 46. In some cases, the computer 12 is connected to hardware dongle (not shown to avoid clutter) storing an access key or other security information, to access the modular control system 11.

The memory 46 can store an assistant software application 50, which may be referred to herein as a skid assistant, a PK assistant, or a modular control system (for brevity, "modular assistant"), implemented as a set of instructions executable on the one or more processors 42. The memory 46 also can store multiple modular control system configurations 52. The modular assistant 50 can allow the user to name modular control system configurations for various versions and various modular control systems. More generally, the modular assistant 50 of this disclosure can operate with any suitable modular control system.

Figure 2:
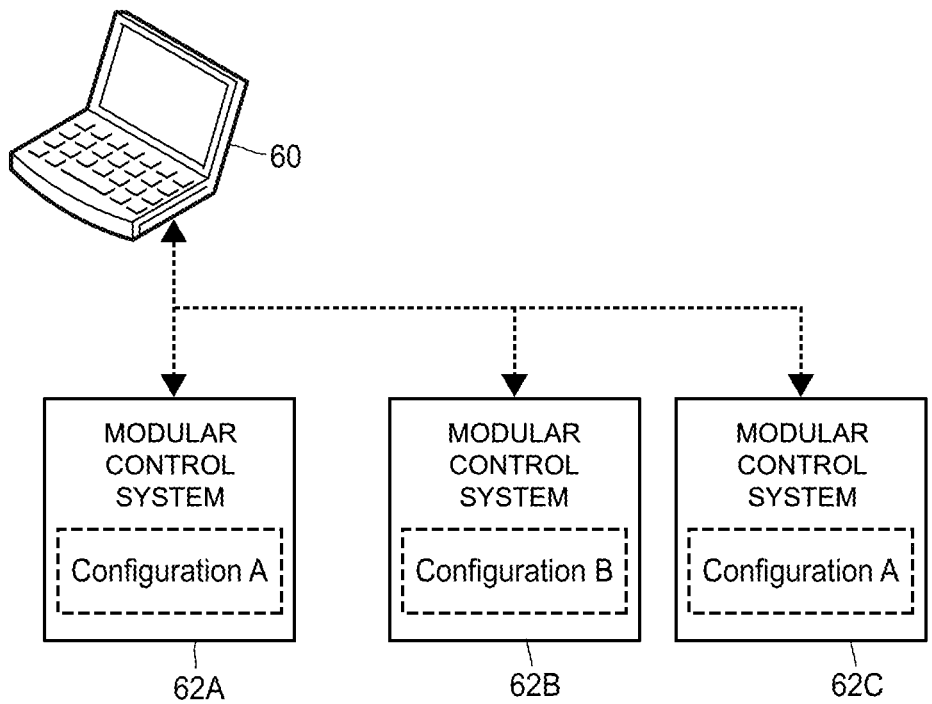
FIG. 2 is a block diagram of multiple modular control systems, the configuration of which a single instance of the assistant application of FIG. 1 can manage.

Referring to FIG. 2, an assistant software application such as the modular assistant 50 can operate in a computer 60 to manage configuration of multiple modular control systems 62A-C. The computer 60 can be similar to the computer 12 discussed above. In different situations, the configuration of the modular control systems 62A-C can be the same or different from each other. For example, the modular assistant 62A can allow the user to efficiently retrieve configuration A from the modular control system 62A and apply the retrieved configuration A to the modular control system 62C. The modular control system 62C can have a different configuration B.

An operator can use the same computer 60 to manage configurations in the systems 62A-C, check for differences in configuration (e.g., configuration A versus configuration B), check for errors in configuration (e.g., configuration A versus a benchmark configuration stored in the memory of the computer 62), copy configurations, delete configurations, activate application of configurations to respective modular controllers of the systems 62A-C, etc.

It is noted that, unlike a DCS in which configuration is downloaded from a centralized location to individual controllers (or, if a handheld is used, propagated from a controller up to a workstation and stored in a centralized database), a modular control system operating in a standalone mode is not synchronized with other systems automatically. This may create a problem that generally does not exist in a DCS, and the assistant software application can reduce the probability of errors by managing versions of configuration data and providing copy, edit, error checking, and other functions.

Figure 3:
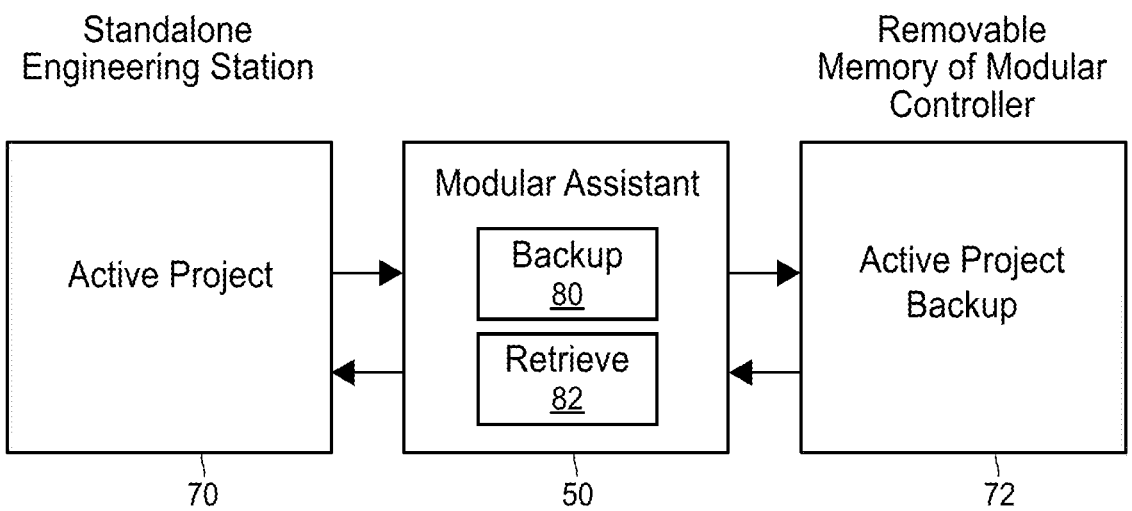
FIG. 3 schematically illustrates interaction between an engineering workstation and the memory of a modular control system via the assistant application of FIG. 1.

FIG. 3 schematically illustrates interaction between an active project 70, which can be stored in an engineering workstation such as the computer 12 or 60, and an active project back-up 72, which may be stored in the memory of a modular control system such as 11, 62A, 62B, or 62C, via the modular assistant 50. The engineering workstation operates as a standalone machine and is configured to exchange project data with a controller of a modular control system via the modular assistant 50. A project can be a coordinated set of data such as configuration files of a distributed control system (e.g., DeltaV), operating information of the distributed control system (e.g., real-time data, alarms, security data), device settings, asset management data, etc. The project can include a placeholder for a modular controller. The placeholder can be commissioned or decommissioned in the project.

The modular assistant 50 can facilitate the exchange of an entire project or a selected portion a project. In this case, the saving (or backup) operation is conceptually separated from the download operation. In other words, the modular assistant 50 can save a new configuration to a memory of a modular control system, such as the memory card 23 discussed above, without downloading this configuration into the modular control system. This allows projects in any phase and with any procedure to be supported. Moreover, this approach allows the user to better control when the modular control system accesses memory modules.

As illustrated in FIG. 3, the modular assistant 50 can support a backup operation 80 to transfer the active project 70 into the removable memory of the modular controller, to be saved as the active project backup 72. The modular assistant 50 also can support a retrieve operation 82 to retrieve the active project backup 72. The modular assistant 50 then can compare the projects 72 and 70, merge the projects 72 and 70, or copy the projected 72 into the project 70 so as to transfer the corresponding data to other modular control systems, for example.

Generally speaking, the modular assistant 50 can support various combinations of the commissioning status of the modular controller and the commissioning status of the active project and, in some cases, automatically suggest certain actions to the operator of the engineering workstation. The modular assistant 50 can identify these possible actions upon determining that the workstation is connected to a modular controller. For example, when a standalone engineering workstation executing the modular assistant 50 connects to a modular controller, and when the network settings of the engineering workstation are correct, the modular assistant 50 can notify the operator that he or she needs to perform commissioning steps when a placeholder for a modular controller in the active project 70 is not commissioned and when the physical modular controller is not commissioned. When the placeholder in the active project 70 is commissioned but the physical modular controller is not commissioned, the modular assistant 50 can prompt the user to perform commissioning steps. The user in this case can first decommission the placeholder and then re-commission the placeholder.

When both the placeholder in the active project 70 and the modular controller are commissioned, the modular assistant 50 can compare the commissioned configuration data (i.e., the projects). If there is no match, the modular assistant 50 can prompt the user for the password and guide the operator through different actions that can be performed to align the active project 70 with the project in the attached modular controller. In particular, the modular assistant 50 can suggest switching to a project that is correct for the attached modular controller (as discussed above, the computer 12 or 60 can store multiple projects, which can be used with different modular controllers. The modular assistant 50 alternatively can suggest that the configuration data be retrieved from the modular controller into a new active project. As yet another alternative, the modular assistant 50 can suggest that the operator can connect to a different modular controller. Otherwise, if there is match, the modular assistant 50 can only prompt the user for the password and notify the user that the active project 70 and the project in the attached modular controller are aligned.

When the placeholder in the active project 70 is not commissioned, and when the modular controller is commissioned, the modular assistant 50 can prompt the user for the password and, to align the active project 70 with the configuration of the modular controller, suggest that the operator switch to a project that is correct for the modular controller, or retrieve the configuration of the modular controller into a new active project, or retrieve the configuration of the modular controller into the current active project 70, or connect the workstation to a different modular controller.

Figure 4:
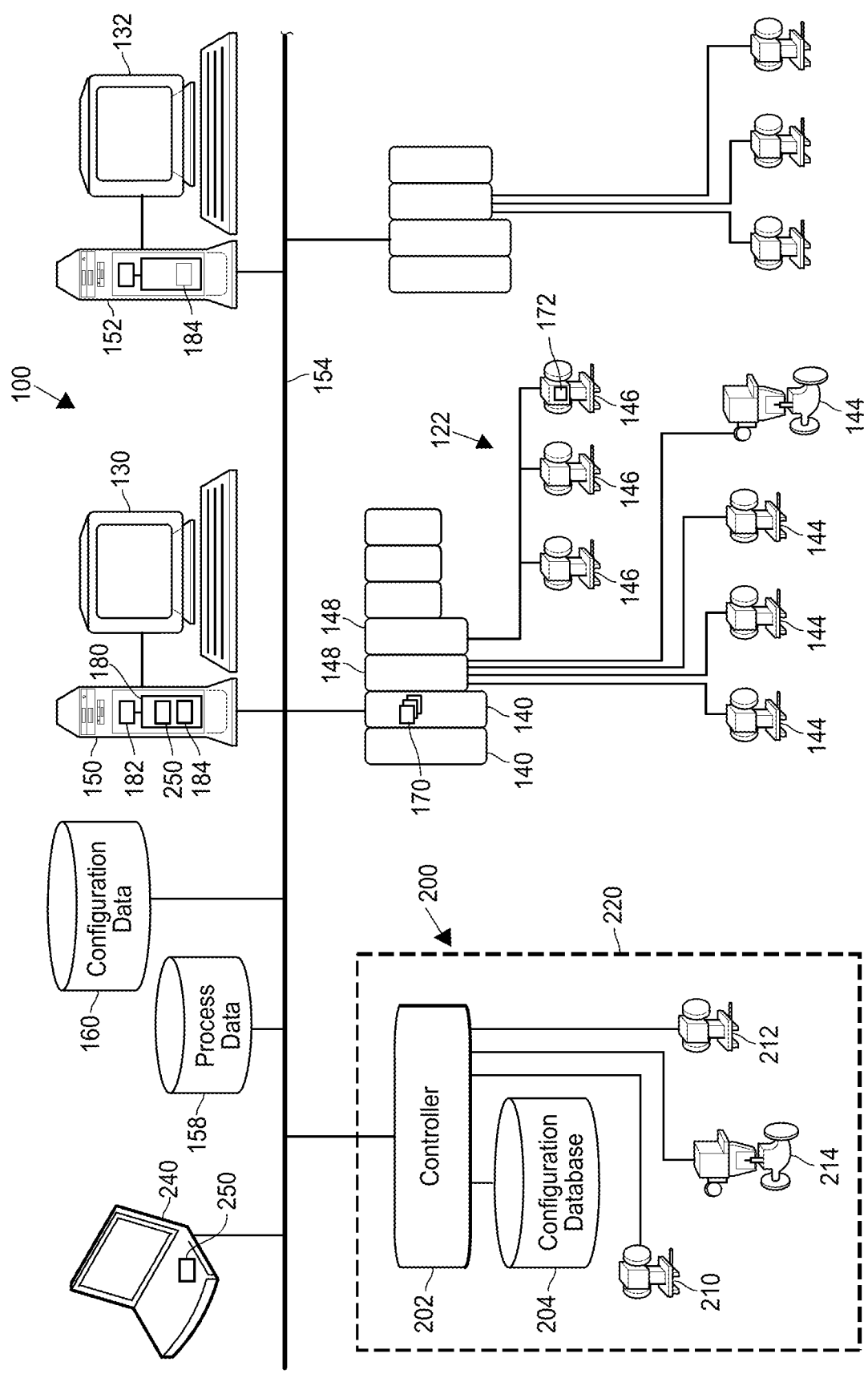
FIG. 4 is a block diagram of a distributed process control system into which the modular control system can be integrated in some scenarios.

Prior to example scenarios in which the modular system 50 interacts with a modular control system operating in a standalone mode, example integration of the modular control system into a distributed control system is considered with reference to FIG. 4. As discussed above, a modular control system in at least some of the implementations can operate as a standalone node or be seamlessly integrated into a distributed control system and operate as a distributed node.

FIG. 4 illustrates an example process plant 100 that implements a distributed control system 122. As is typical, the distributed process control system 122 has one or more controllers 140, each connected to one or more field devices or smart devices 144 and 146 via input/output (I/O) devices or cards 148 which may be, for example, Fieldbus interfaces, Profibus interfaces, HART interfaces, standard 4-20 ma interfaces, etc. The controllers 140 are also coupled to one or more host or operator workstations 150, 152 via a data highway 154 which may be, for example, an Ethernet link or another link suitable local area network (LAN) link. A process data database 158 may be connected to the data highway 154 and operates to collect and store parameter, status and other data associated with the controllers and field devices within the plant 100. During operation of the process plant 100, the process data database 158 may receive process data from the controllers 140 and, indirectly, devices 144-146 via the data highway 154.

A configuration database 160 stores the current configuration of the process control system 122 within the plant 100 as downloaded to and stored within the controllers 140 and field devices 144 and 146. The configuration database 60 stores process control functions defining the one or several control strategies of the process control system 122, configuration parameters of the devices 144 and 146, the assignment of the devices 144 and 146 to the process control functions, and other configuration data related to the process plant 100. The configuration database 160 additionally may store graphical objects to provide various graphical representations of elements the process plant 100. Some of the stored graphical objects may correspond to process control functions (e.g., a process graphic developed for a certain PID loop), and other graphical objects may be device-specific (e.g., a graphic corresponding to a pressure sensor).

The process plant 100 also can include other database coupled to the data highway 154, not shown in FIG. 4 to avoid clutter. For example, a data historian can store events, alarms, comments and courses of action taken by operators. The events, alarms, and comments may pertain to individual devices (e.g., valves, transmitters), communication links (e.g., wired Fieldbus segments, WirelessHART communication links), or process control functions (e.g., a PI control loop for maintaining a desired temperature set point). Further, a knowledge repository can store references, operator logbook entries, help topics, or links to these and other documentation that operators and maintenance technicians may find useful when supervising the process plant 100. Still further, a user database can store information about users such as an operator or a maintenance technician.

Each of these databases can be any desired type of a data storage or collection unit having any desired type of memory and any desired or known software, hardware or firmware for storing data. Of course, the databases need not reside in separate physical devices. Thus, in some embodiments, some of these databases are implemented on a shared data processor. In general, it is possible to utilize more or fewer databases to store the data collectively stored and managed by the databases described above.

While the controllers 140, I/O cards 148 and field devices 144 and 146 are typically distributed throughout the sometimes harsh plant environment, the operator workstations 150 and 152 and the databases 158, 160, etc. are usually located in control rooms or other less harsh environments easily assessable by controller, maintenance, and various other plant personnel. However, in some cases, handheld devices may be used to implement these functions and these handheld devices are typically carried to various places in the plant.

Each of the controllers 140, which may be by way of example the DeltaV™ controller sold by Emerson Process Management, stores and executes a controller application that implements a control strategy using any number of different, independently executed, control modules or blocks 170. Each of the control modules 170 can be made up of what are commonly referred to as function blocks wherein each function block is a part or a subroutine of an overall control routine and operates in conjunction with other function blocks (via communications called links) to implement process control loops within the process plant 100. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique. Each of the controllers 40 may also support the AMS® Suite of applications and may use predictive intelligence to improve availability and performance of production assets including mechanical equipment, electrical systems, process equipment, instruments, field and smart field devices 144, 146, and valves.

In the plant 100 illustrated in FIG. 1, the field devices 144 and 146 connected to the controllers 112 may be standard 4-20 ma devices, may be smart field devices, such as HART, Profibus, or FOUNDATION™ Fieldbus field devices, which include a processor and a memory, or may be any other desired type of devices. Some of these devices, such as Fieldbus field devices (labeled with reference number 146 in FIG. 1), may store and execute modules, or sub-modules, such as function blocks, associated with the control strategy implemented in the controllers 140. Function blocks 172, which are illustrated in FIG. 1 as being disposed in two different ones of the Fieldbus field devices 146, may be executed in conjunction with the execution of the control modules 170 within the controllers 140 to implement process control, as is well known. Of course, the field devices 144 and 146 may be any types of devices, such as sensors, valves, transmitters, positioners, etc. and the I/O devices 148 may be any types of I/O devices conforming to any desired communication or controller protocol such as HART, Fieldbus, Profibus, etc.

The workstations 150 and 152 can include one or more processors 182 that execute instructions stored in memory 180. The instructions can implement, in part, a viewing application 184 that provides various displays during operation of the process plant 10 to enable the operator to view and control various operations within the process plant 100 or, as is common in larger plants, within a section of the process plant 100 to which the corresponding operator is assigned. The viewing application 184 may include, or cooperate with, support applications such as control diagnostic applications, tuning applications, report generation applications or any other control support applications that may be used to assist the operator in performing control functions. Further, the viewing application 184 can permits a maintenance technician to supervise the maintenance needs of the plant 100, e.g., to view the operating or working conditions of various devices 140, 144, and 146. The viewing application also may include support applications such as maintenance diagnostic applications, calibration applications, vibration analysis applications, report generation applications or any other maintenance support applications that may be used to assist a maintenance technician in performing maintenance functions within the plant 100.

With continued reference to FIG. 4, an example modular control system 200 can be implemented similar to the modular control system 1 of FIG. 1. The modular control system 200 includes a modular controller 202, a configuration database 204, and specialized equipment that can include field devices 210. The modular control system 200 can be a skid-mounted system in which the devices 202, 204, and 210-114 reside within a physical frame 220. The modular control system 200 can be configured to operate in a standalone mode and perform a relatively complex function in a plant, such as pump liquid in a controlled manner, heat water and maintain a certain temperature in a tank, perform a filtration function, etc. To this end, the modular control system 200 can include valves, tanks, sensors, etc.

The modular controller 202 can be built natively on the platform of the distributed control system 122. In other words, the modular controller 202 is developed specifically for use in the distributed control system 122, while also being capable of autonomous operation. To this end, the modular controller 202 can include firmware and/or software functions that does not require an intermediary (such as a porting/adaptation layer of firmware and/or software or the corresponding application programming interface (API) functions) to interact with the nodes of the distributed control system 122. The modular controller 202 in a certain software architecture shares one or more software layers with other controllers of the distributed control system 122. In any case, as native to the platform of the distributed control system 122, configuration, security mechanisms, and the communications of the modular controller 202 are fully compatible with the distributed control system 122.

The configuration database 204 can be stored on a non-transitory computer-readable memory such as a hard disk or a flash drive, for example. The computer-readable memory and the modular controller 202 can be provided as part of a single chipset of separately, depending on the implementation.

A manufacturer can assemble the modular control system 200, configure the parameters of the modular control system 200 with setpoint values and other parameter such as the gain value for a PID loop, names and tags for the field devices 210, licenses, locales, etc. The manufacturer also can configure parameter security. For example, the manufacturer can make the gain value a part of restricted control, and require that this value be changed only upon providing a proper key to unlock this variable. In some cases, the manufacturer can completely assemble the modular control system 200 for shipping as an integral unit.

As illustrated in FIG. 4, the modular control system 200 can be coupled to the plant 100 and the distributed control system 122 via the data highway 154. A host 240, which can be a laptop computer, for example, can execute a merge assistant application to facilitate merging the modular control system 200 into the distributed control system 122. Alternatively, the merge assistant 250 can be implemented in the operator workstation 250 or 252. In operation, the merge assistant 250 assists operators with efficiently and accurately merging configuration data from the configuration database 204 into the centralized configuration database 160. In some cases, the merge assistant 250 also generates automatic suggestions regarding renaming or relabeling items in the configuration database 204 to resolve conflicts with items in the configuration database 160. The merge assistant 250 then loads the updated configuration data into the configuration database 204. In some cases, the host 240 stores configuration data of the modular control system 200 while the configuration data is being updated.

According to another implementation, the merge assistant 250 distributes the new configuration data introduced by way of integrating modular control system into the distributed control system 122, thereby eliminating the need to import new data into the configuration database 160. In particular, rather than copying configuration data, the merge assistant 250 can update the configuration database 204 in situ with new tags to ensure uniqueness in the scope of the distributed control system 122. In this manner, the merge assistant 250 can reduce the time required to integrate a modular control system into a distributed control system, and in some cases may even provide "instant import."

Although FIG. 4 depicts only one modular control system 200, multiple modular control systems can be integrated into the distributed process control system 122. The merge assistant 250 in this case can detect modular control systems coupled to the data highway 154 and iteratively merge the corresponding configurations into the centralized configuration database 160.

As illustrated in FIGS. 5A-20, the modular assistant 50 can provide various interactive screens to facilitate various operations related to a modular control system operating in a standalone mode.

Figure 5A:
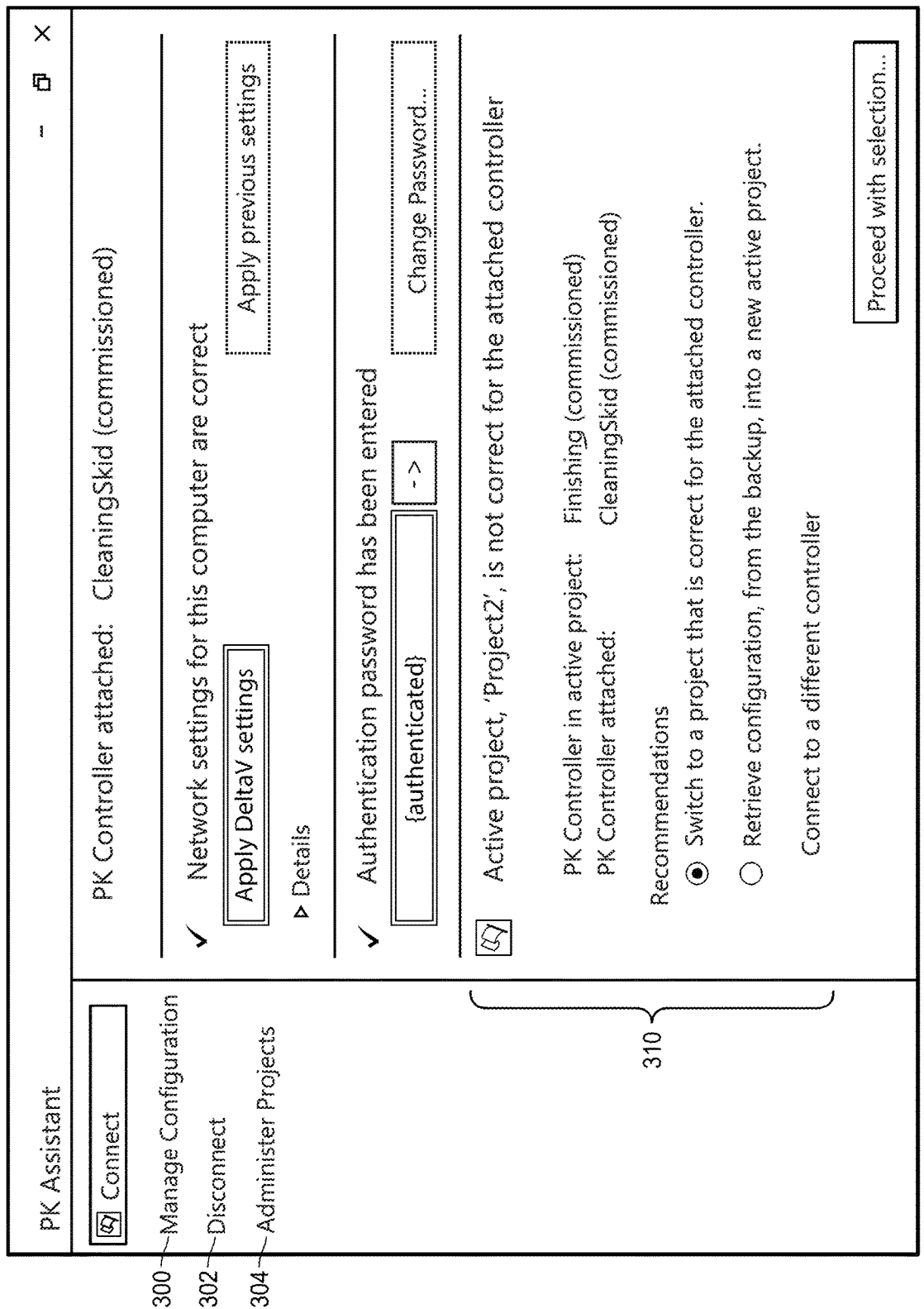
FIGS. 5A-D illustrate example interactive screens which the assistant application of FIG. 1 can present to an operator to provide access to connection, configuration management, disconnection, and administration functions, respectively.
Figure 5B:
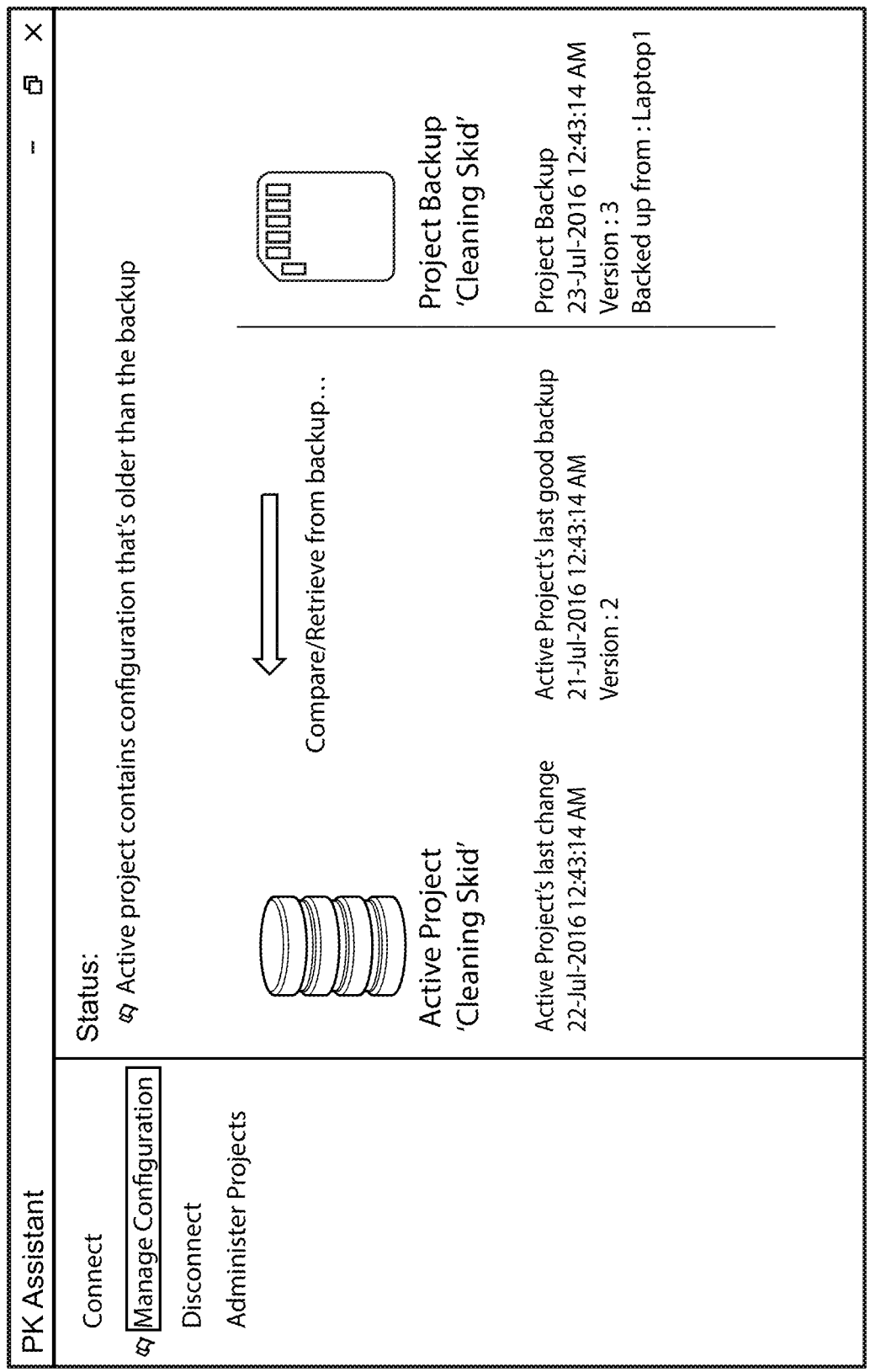
Figure 5C:
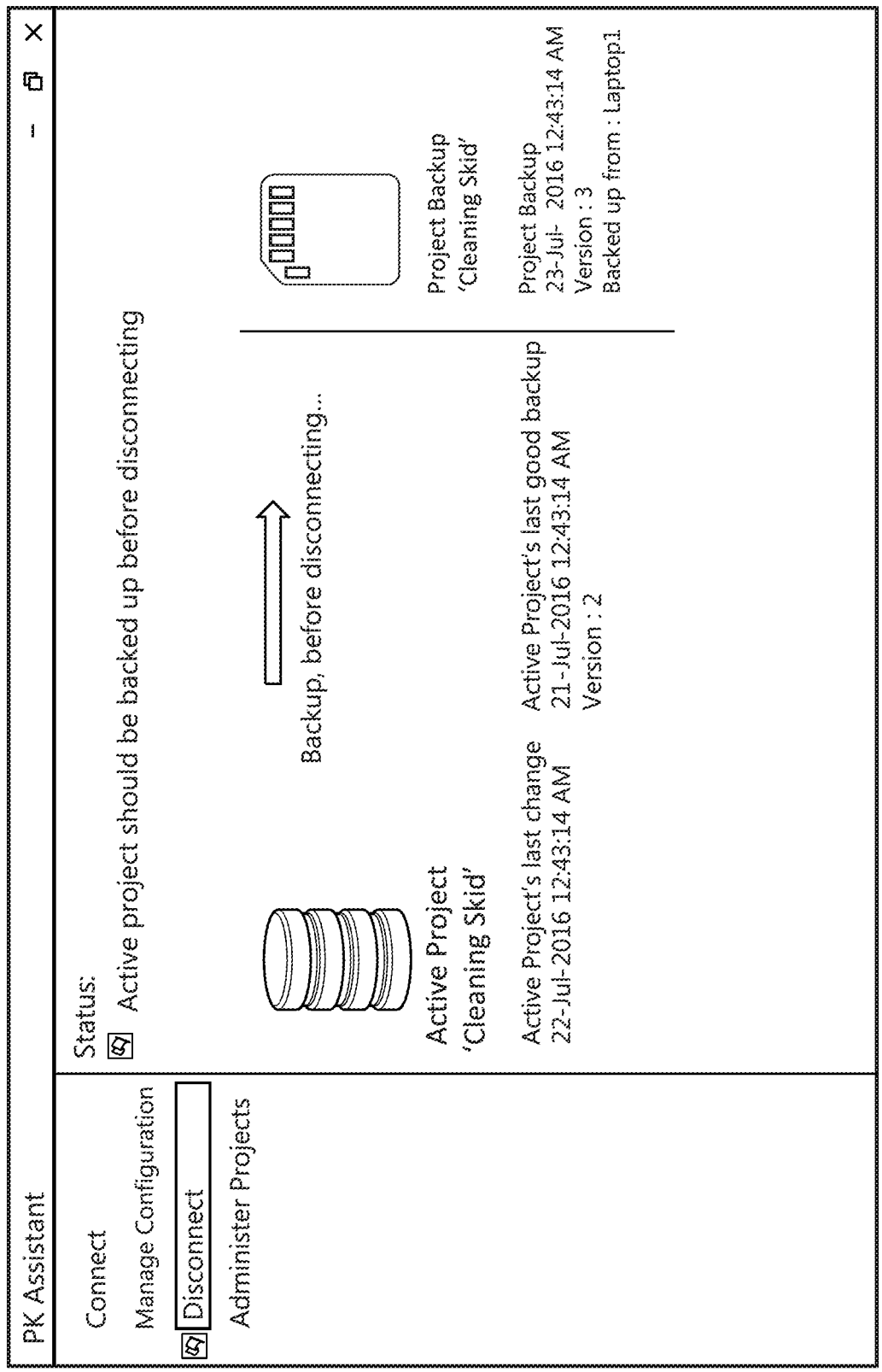

In particular, FIGS. 5A-D illustrate example interactive screens which the modular assistant 50 can present to an user to provide access to connection, configuration management, disconnection, and administration functions. The "connect" functionality generally allows the standalone computer (such as the computer 20 or 60) on which the modular assistant 50 is executing align with the modular controller to which the standalone computer is connected. The modular assistant 50 can advantageously provide a "one-stop place" for notifying the user whether the configuration data in the standalone computer and the modular controller matches. The example interactive screen of FIG. 5A provides a summary of the connection with the physical modular controller and, when applicable, notify the user of potential problems. In general, the modular assistant 50 detects proper alignment when the user has entered a password, when the active project is correct, and when the network settings of the standalone computer are correct. Further, the modular assistant 50 can display a certain icon when the active project is incorrect for the attached modular controller. The modular assistant 50 also can provide icons in the form of flags, for example, when other problems are detected.

Figure 5D:
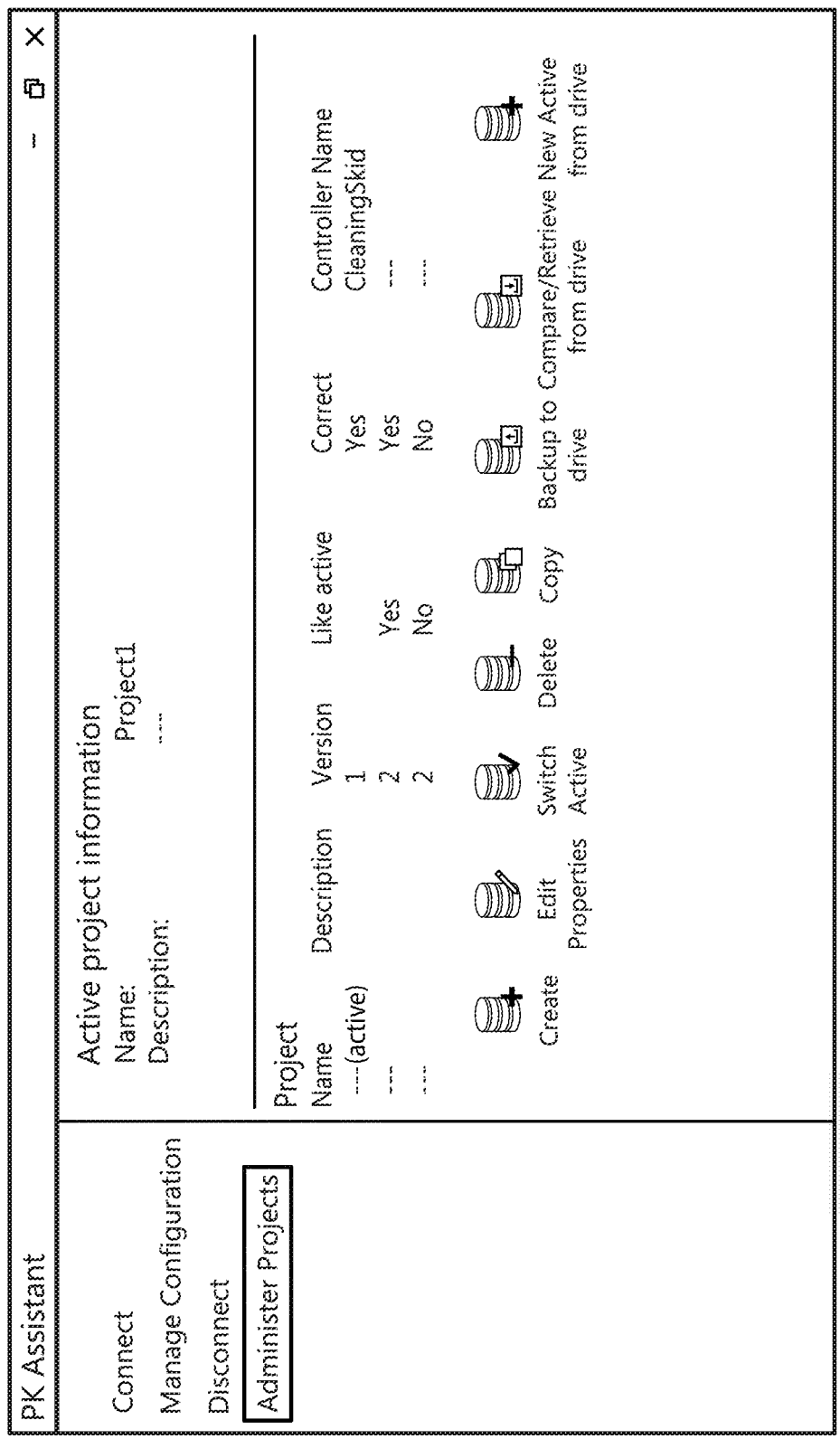

In this example implementation, the modular assistant 50 provides the disconnect function 300 to remind the user about backing up data to a removable memory card (e.g., see memory card 23 in FIG. 1). The manage configurations function 302 allows the user to compare and retrieve projects. The administer projects function 304 allows the user to see what projects are available and perform such operations as creation, deletion, copying, etc. As illustrated in FIG. 5D, the modular assistant 50 can display the appropriate values of the "like active" flag to indicate whether the project has the same commissioning data as the active project. As also illustrated in FIG. 5D, the modular assistant 50 can display the appropriate values of the "like active" flag to indicate whether a certain project is correct for the attached modular controller. The modular assistant 50 can display information 310, or another suitable recommendation, when the project is not correct for the attached modular controller.

In an example scenario, user using a portable computer connects to a commissioned modular controller. The network card settings for the portable computer are incorrect for the purposes of communicating with the modular controller, and the active project is not correct for the modular controller. The modular assistant 50 first can notify the user that a modular controller has been detected, but the network settings of the user's computer do not permit full communications. In an example implementation, the modular assistant 50 displays a hierarchical view of a network in an explorer window (which may be similar to the DeltaV Explorer window, for example). The hierarchical view can indicate that, under the physical network, there is a control network category with a modular controller and a portable computer not connected.

Figure 6A:
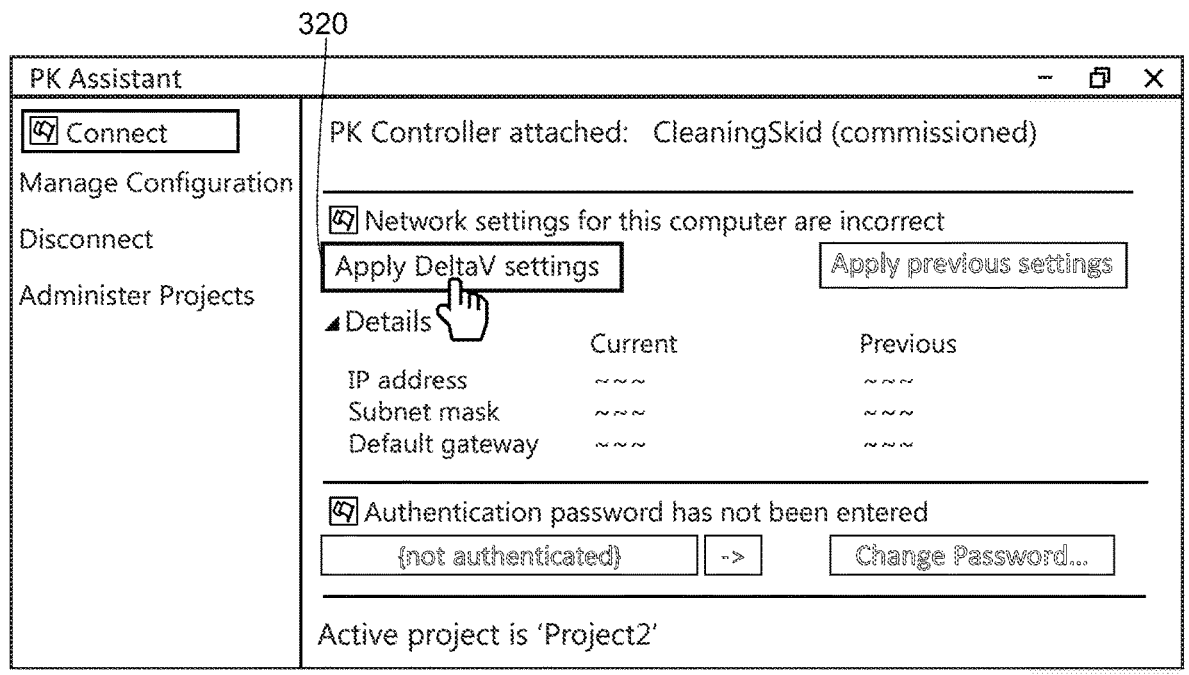
FIGS. 6A-F illustrate an example sequence of interactive screens which the assistant application of FIG. 1 can present to an operator when the operator connects to a commissioned modular control system.
Figure 6B:
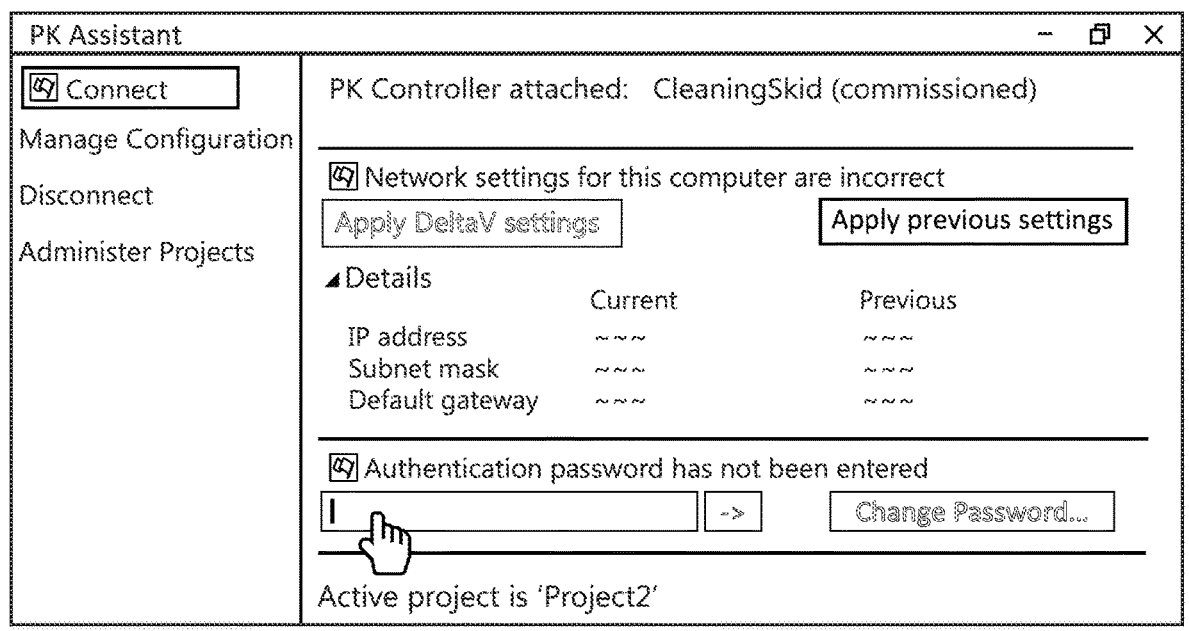
Figure 6C:
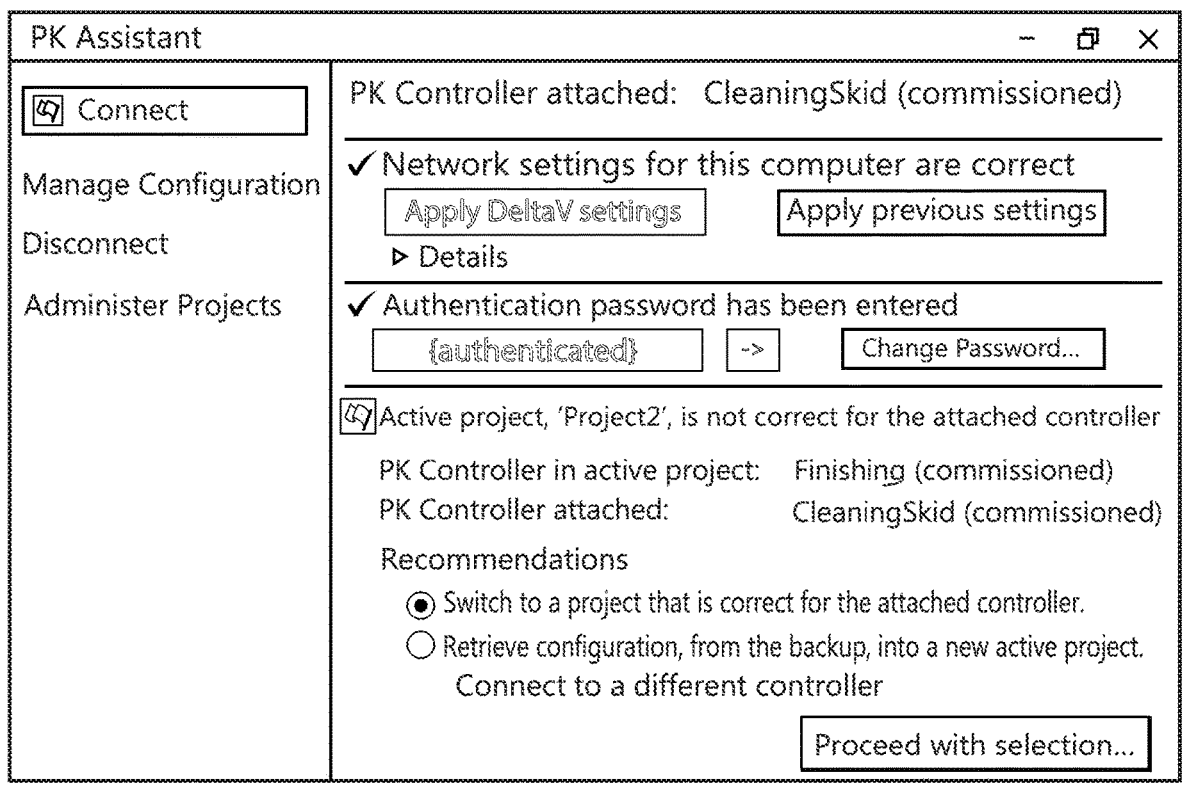
Figure 6D:
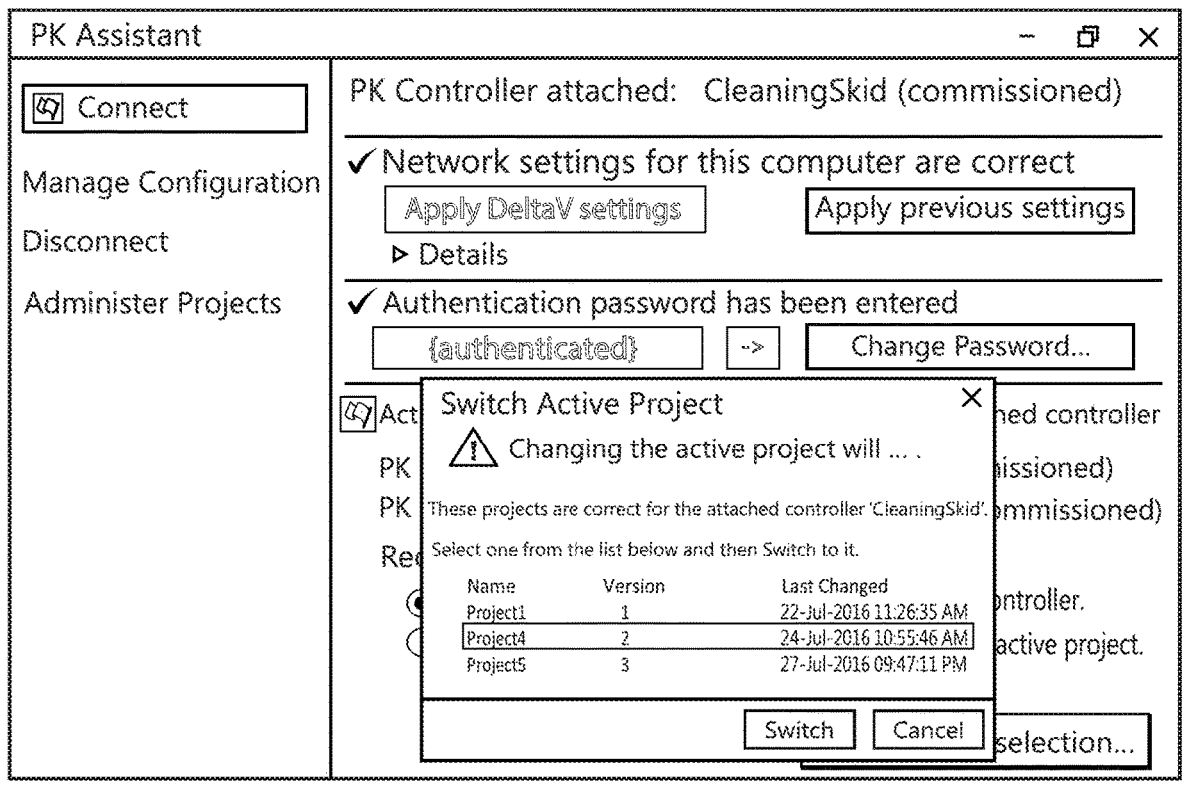
Figure 6E:
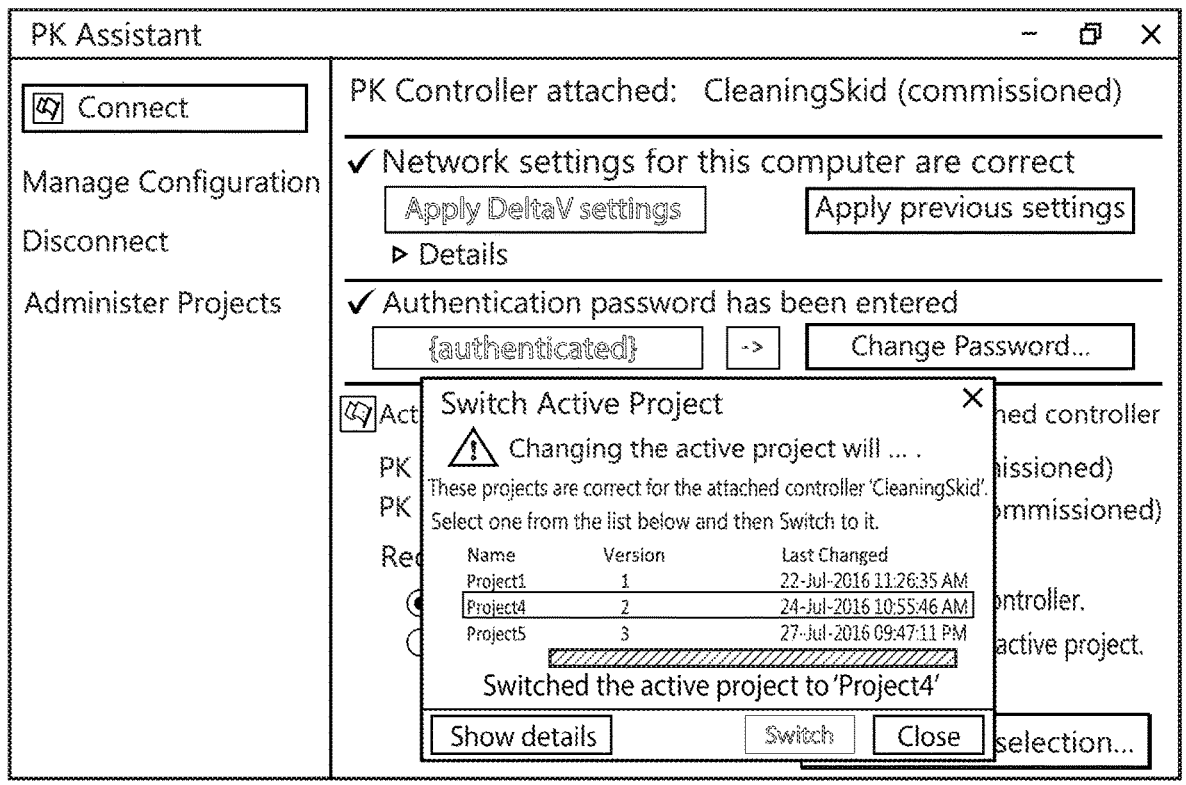
Figure 6F:
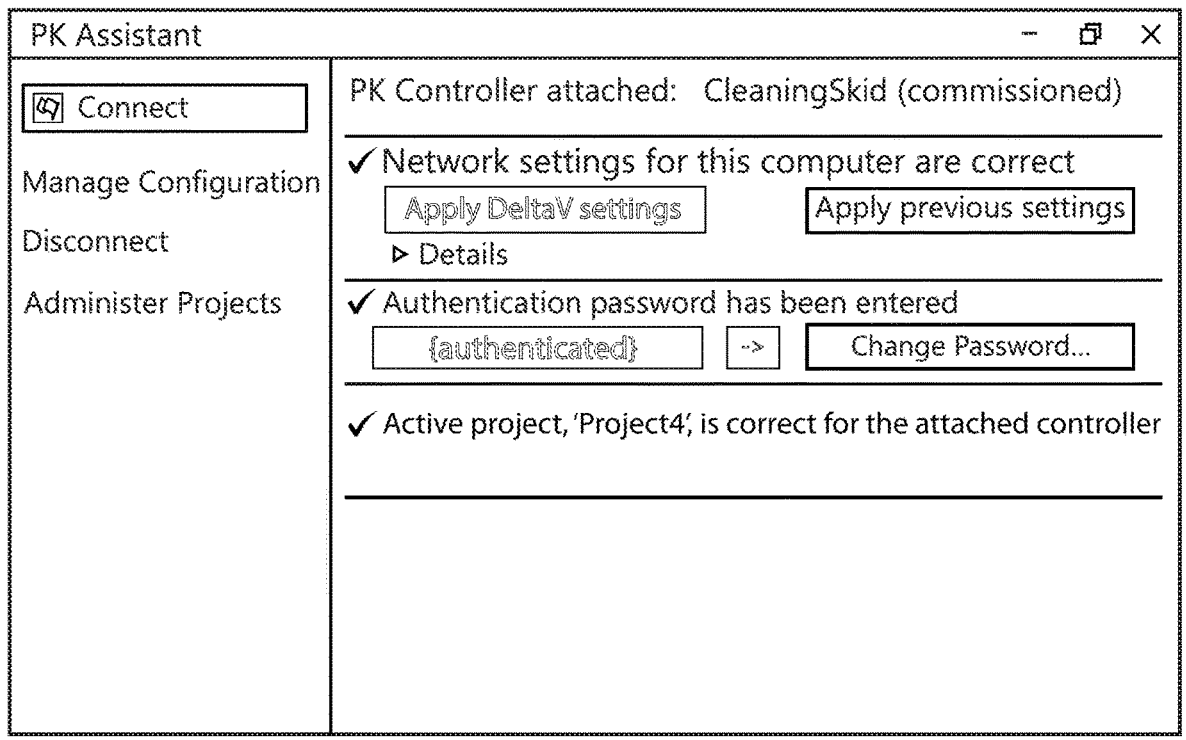

The user then can activate a control 320 to attempt to apply the network settings of a distributed control system such as DeltaV (FIG. 6A). If the applied network settings are correct, the modular controller requests authentication via the modular assistant 50 (FIG. 6B). The modular assistant 50 then can determine that the active project is not correct, and provide an appropriate notification to the user (FIG. 6C). The user then can switch to the correct project (FIGS. 6D and 6E). The modular assistant 50 then notifies the user that the connection between the portable computer and the modular controller is correct (FIG. 6F).

Figure 7A:
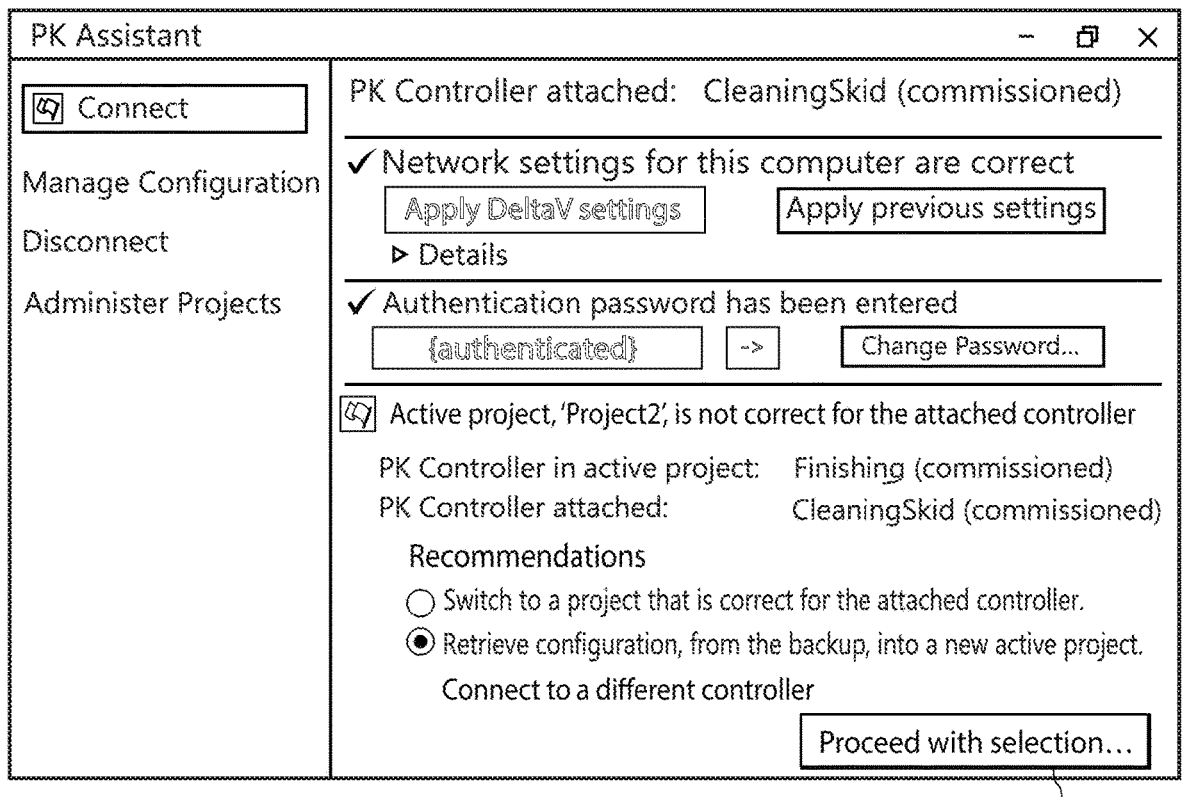
FIGS. 7A and 7B illustrate an example sequence of interactive screens which the assistant application of FIG. 1 can present to an operator when the operator retrieves configuration from a backup storage into a new active project.
Figure 7B:
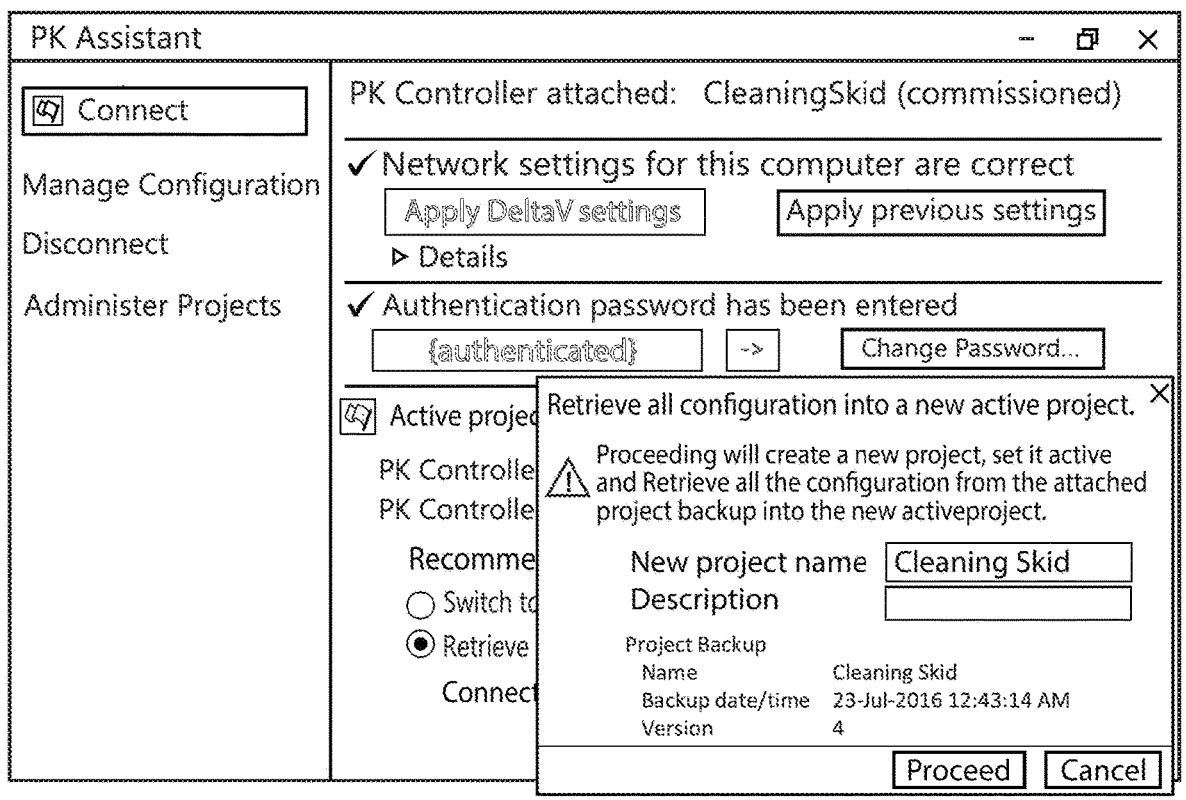

The user then may choose to retrieve the configuration from the project backup (such as the project 72 depicted in FIG. 3) into a new active project. For example, when the operator has provided the proper authentication password to access the modular controller, the modular assistant 50 can automatically extract the project 72 into a new active project to be stored in the memory of the workstation. The modular assistant 50 to this end can provide several interactive options, selectable via respective radio buttons, and the user may select the desired option and user a control 350 to proceed (FIG. 7A). The modular assistant 50 then can auto-populate the name with the name of the project from the project backup of the modular controller (FIG. 7B).

Figure 8A:
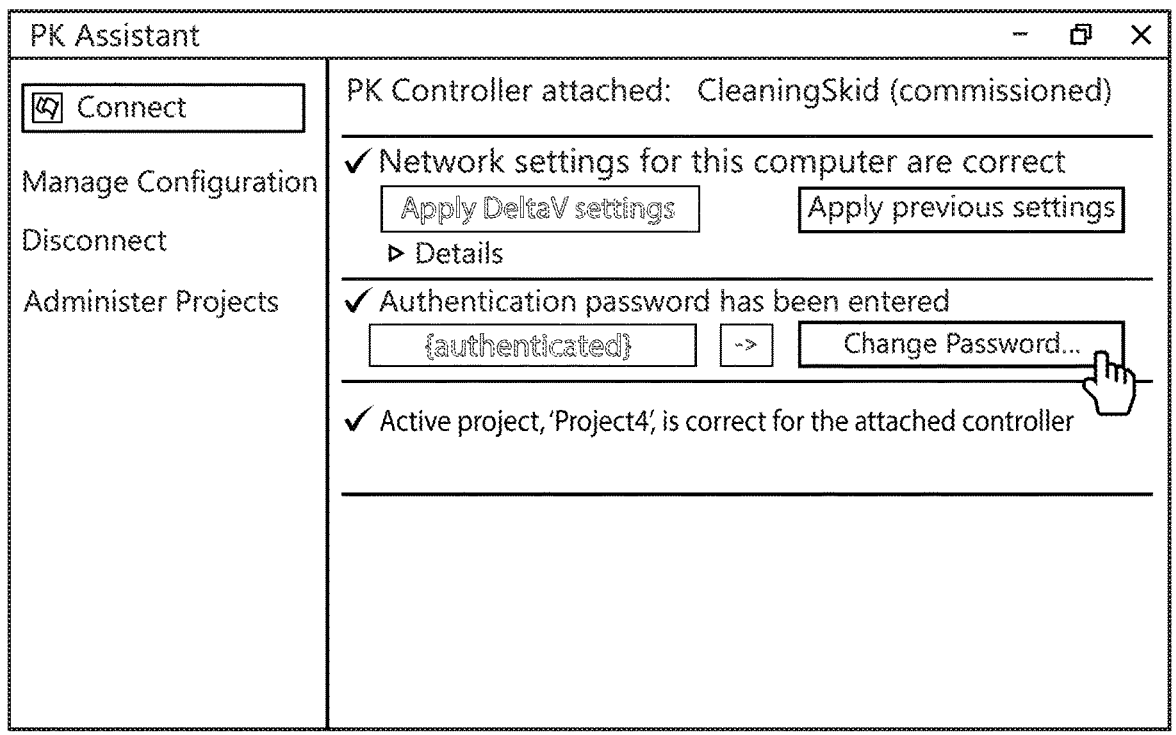
FIGS. 8A and 8B illustrate an example sequence of interactive screens which the assistant application of FIG. 1 can present to an operator when the operator wishes to change the password on a commissioned modular control system without decommissioning the modular control system.
Figure 8B:
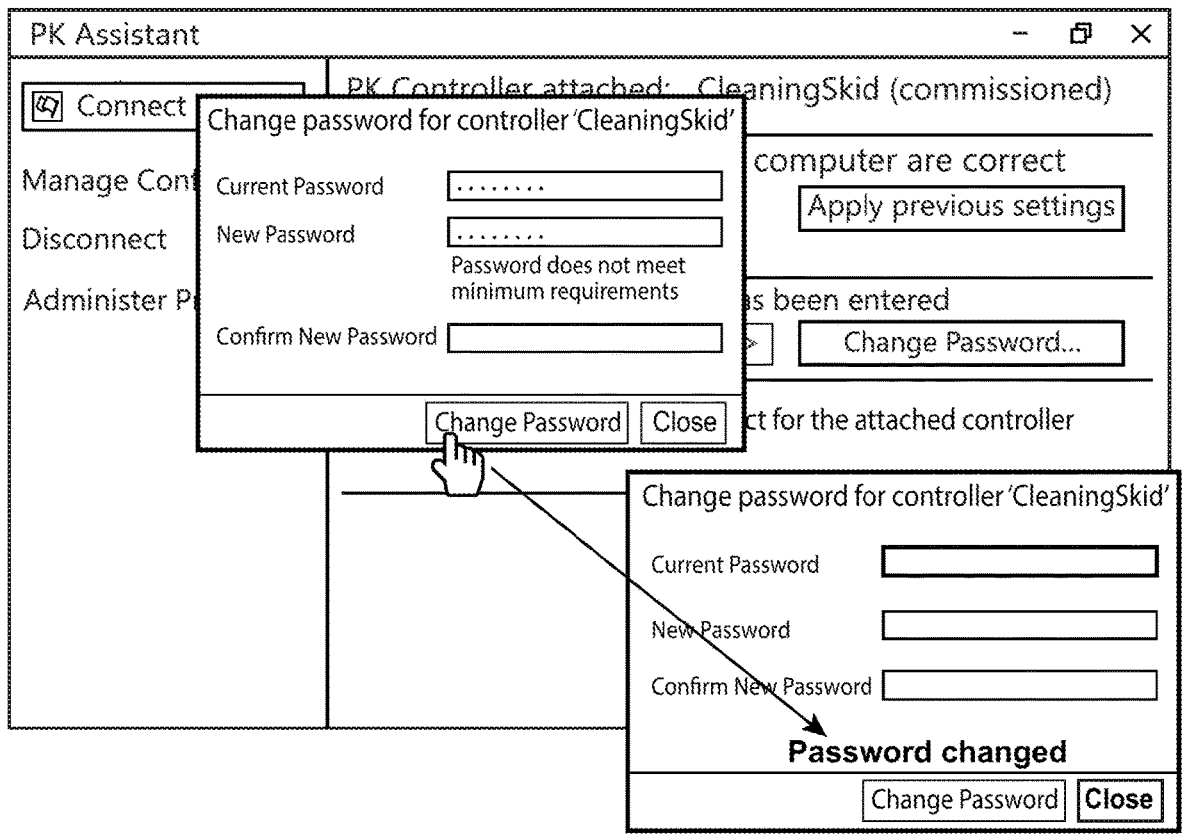

In another example scenario, the user may wish to change the password on a commissioned modular controller. The user in this scenario has already authenticated with the commissioned modular controller. The user wishes to change the password without decommissioning the modular controller. The user activates the appropriate control (FIG. 8A) and the modular assistant 50 provides appropriate notification when the password has been successfully changed (FIG. 8B).

Figure 9A:
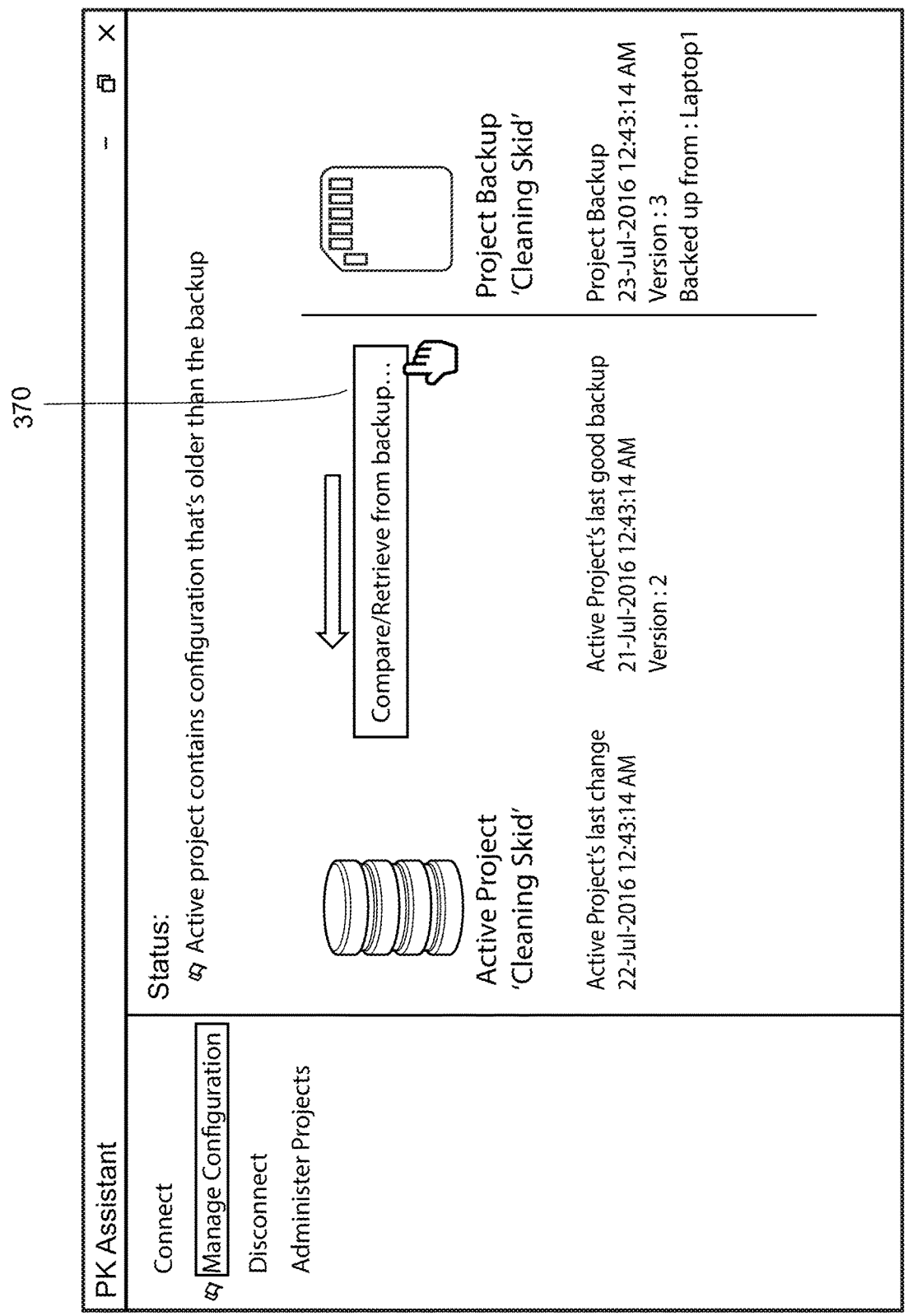
Figure 9C:
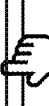

In another example scenario, the user has certain changes that are not backed up, and another user made some changes as well. In particular, the user made some edits before connecting his or her portable computer to the modular controller. The user connects to a modular controller, and the modular assistant 350 notifies the user that the modular controller has certain changes that are missing from the configuration data stored in the user's personal computer. The user decides to retrieve this configuration from the project storage of the modular controller. The user activates a control 370 provided by the modular assistant 50 (FIG. 9A). In response, the modular assistant 50 generates a report 380 of conflicting items (FIG. 9B). The modular assistant 50 can visually emphasize (e.g., by highlighting or underlining, as illustrated in FIG. 9B) the date and time stamps that are newer. The user then can activate checkboxes 400 for certain items and retrieve these items (FIG. 9C). The modular assistant 50 then can retrieve the selected items and display progress (FIGS. 9D and 9E).

Figure 10A:
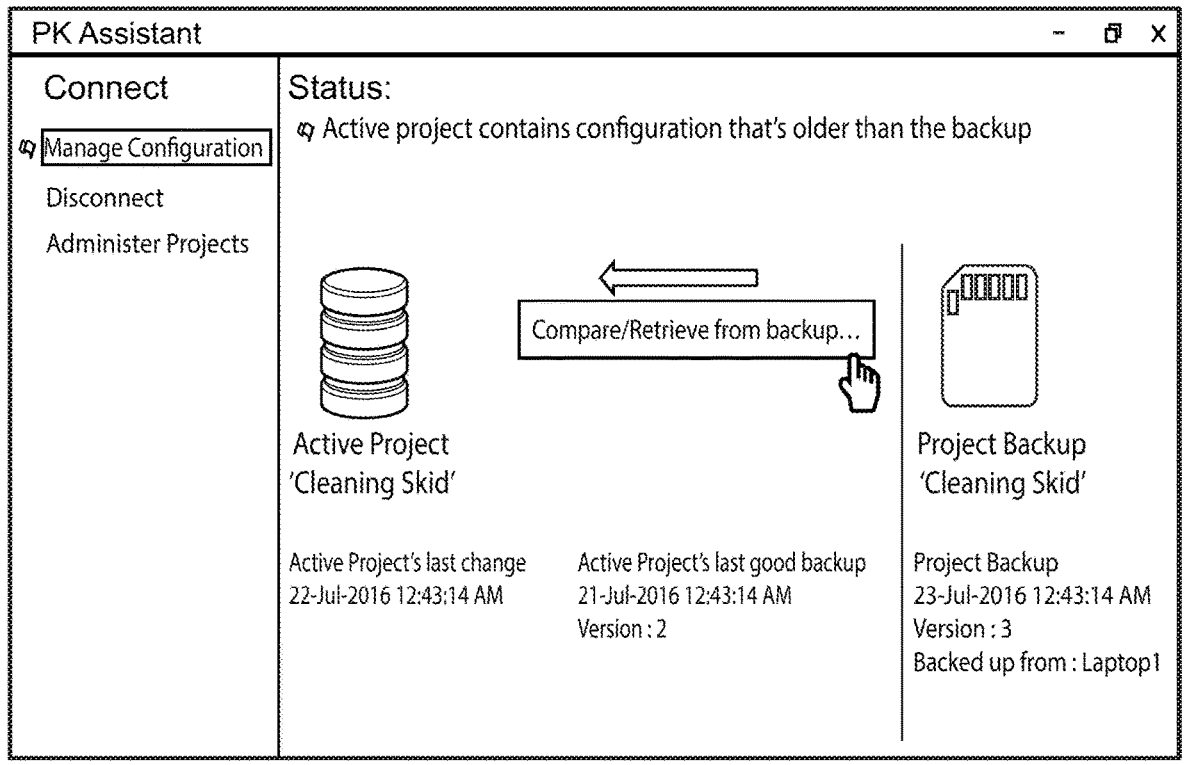
FIGS. 10A and 10B illustrate an example sequence of interactive screens which the assistant application of FIG. 1 can present to an operator when the operator retrieves configuration from a backup storage.
Figure 10B:
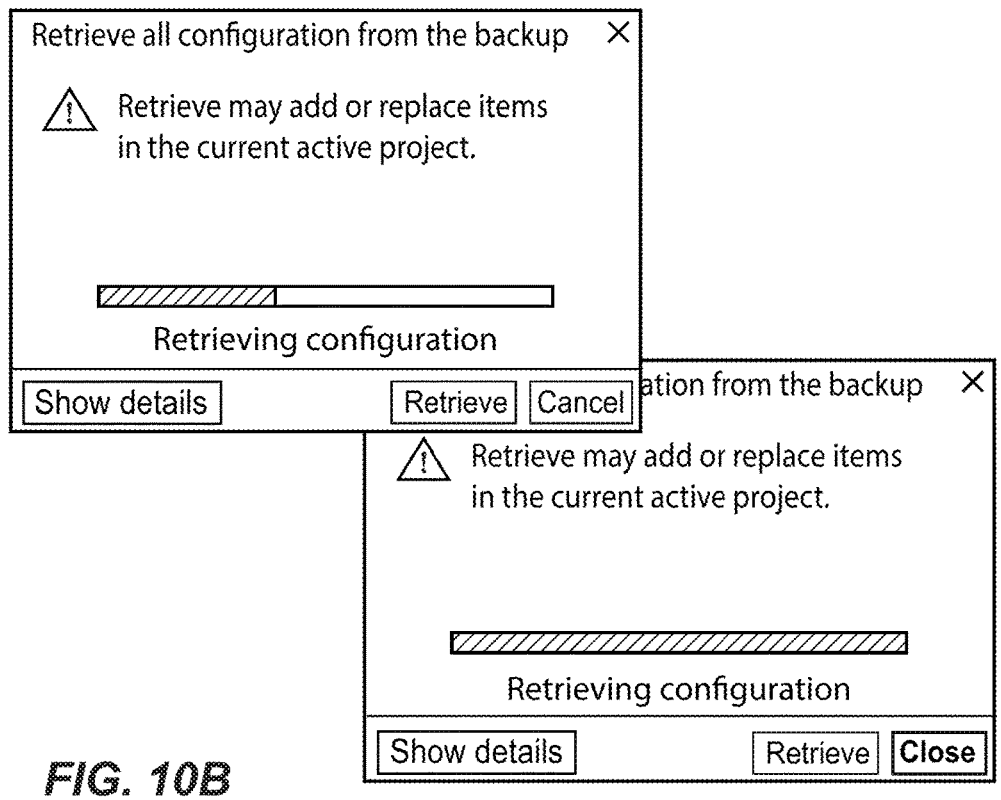

According to another scenario, the user has the basic license. The user retrieves from the backup project (FIG. 10A), but the modular assistant 50 does not display a detailed comparison (FIG. 10B).

Figure 11:
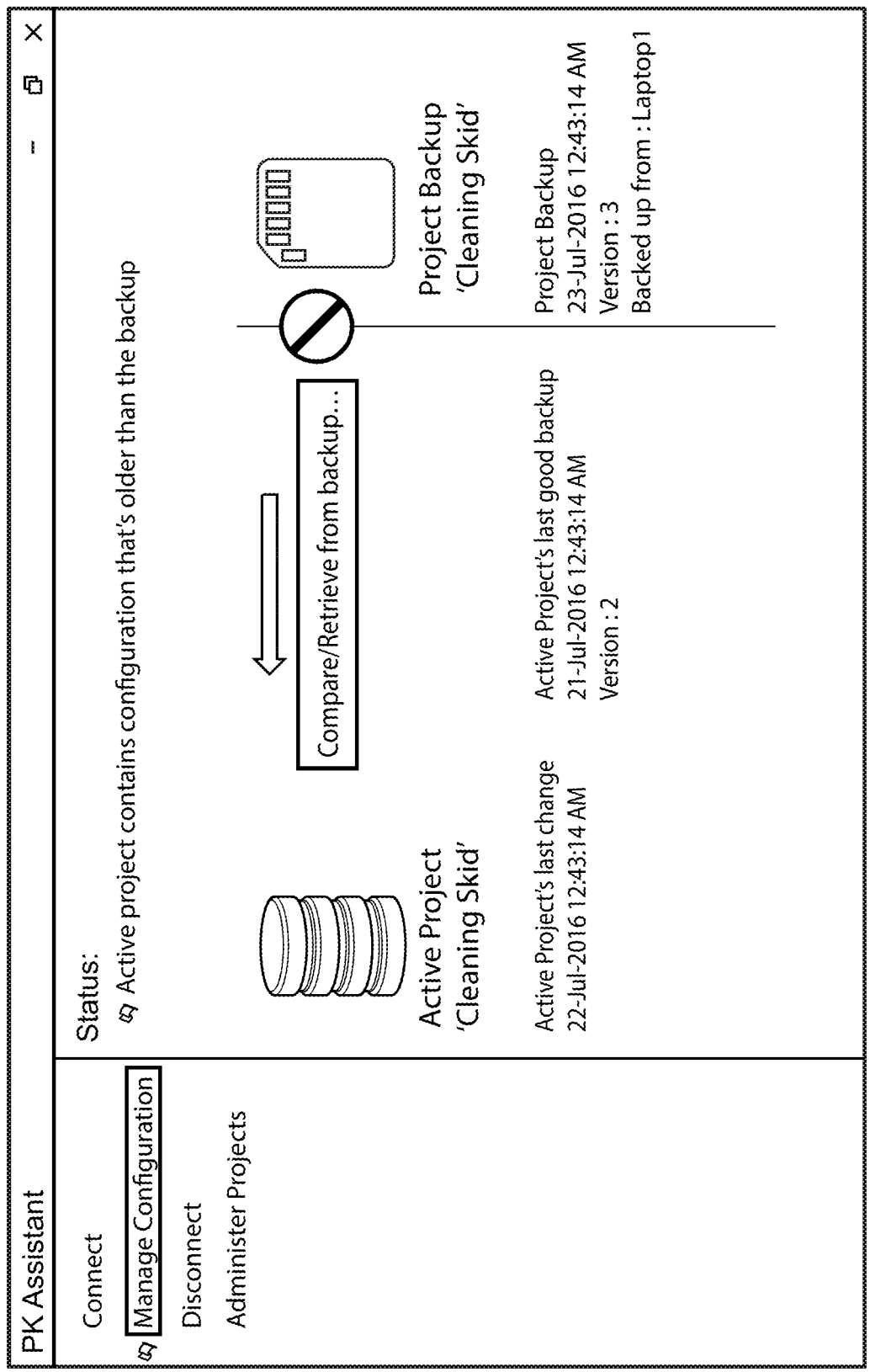
FIG. 11 illustrates an example interactive screen which the assistant application of FIG. 1 can present to an operator when the active project is not correct for the attached controller.

In another example scenario, the active project is not correct for the attached modular controller. The modular assistant 50 provides an appropriate notification as illustrated in FIG. 11.

Figure 12A:
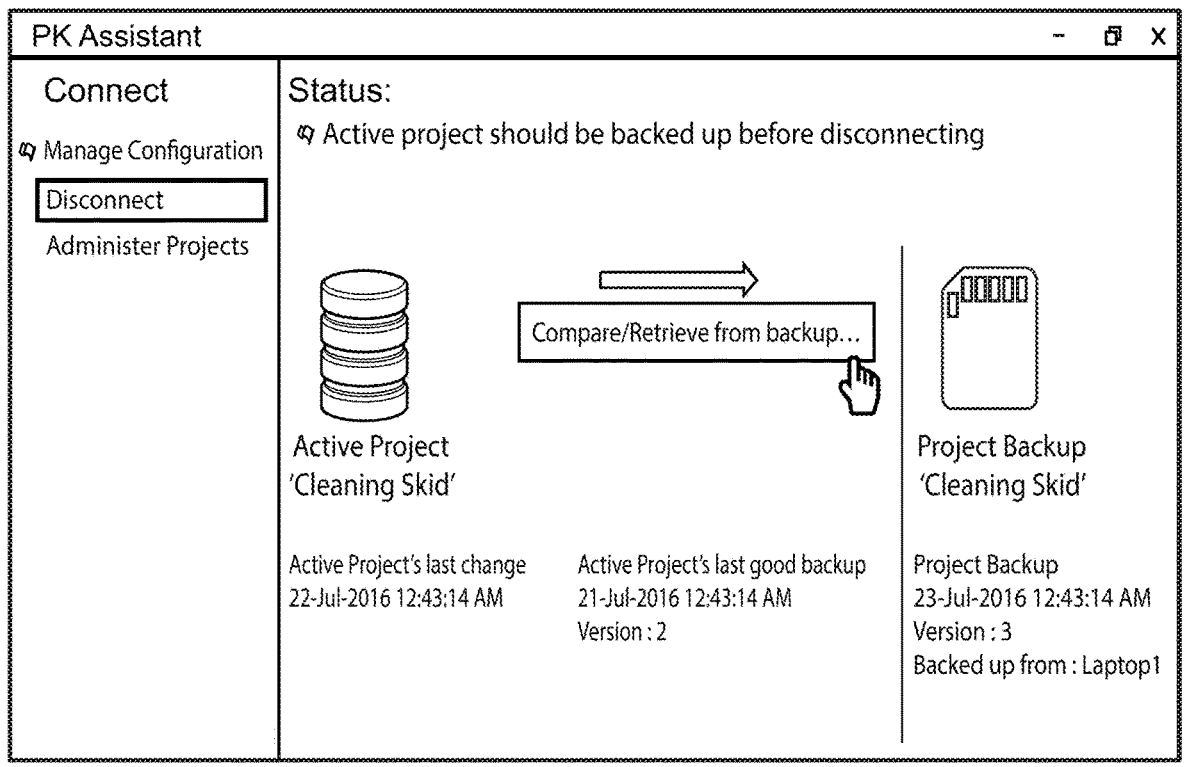
FIGS. 12A-E illustrate an example sequence of interactive screens which the assistant application of FIG. 1 can present to an operator when the operator backs up the active project.
Figure 12B:
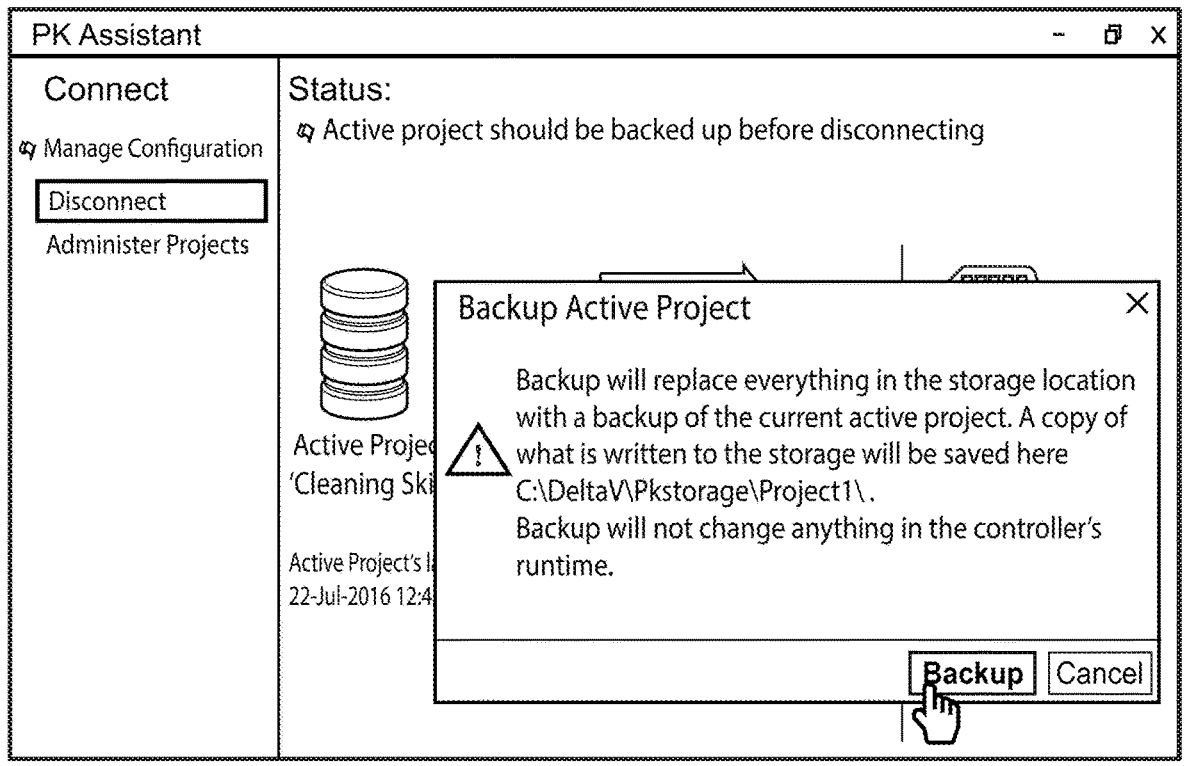
Figure 12C:
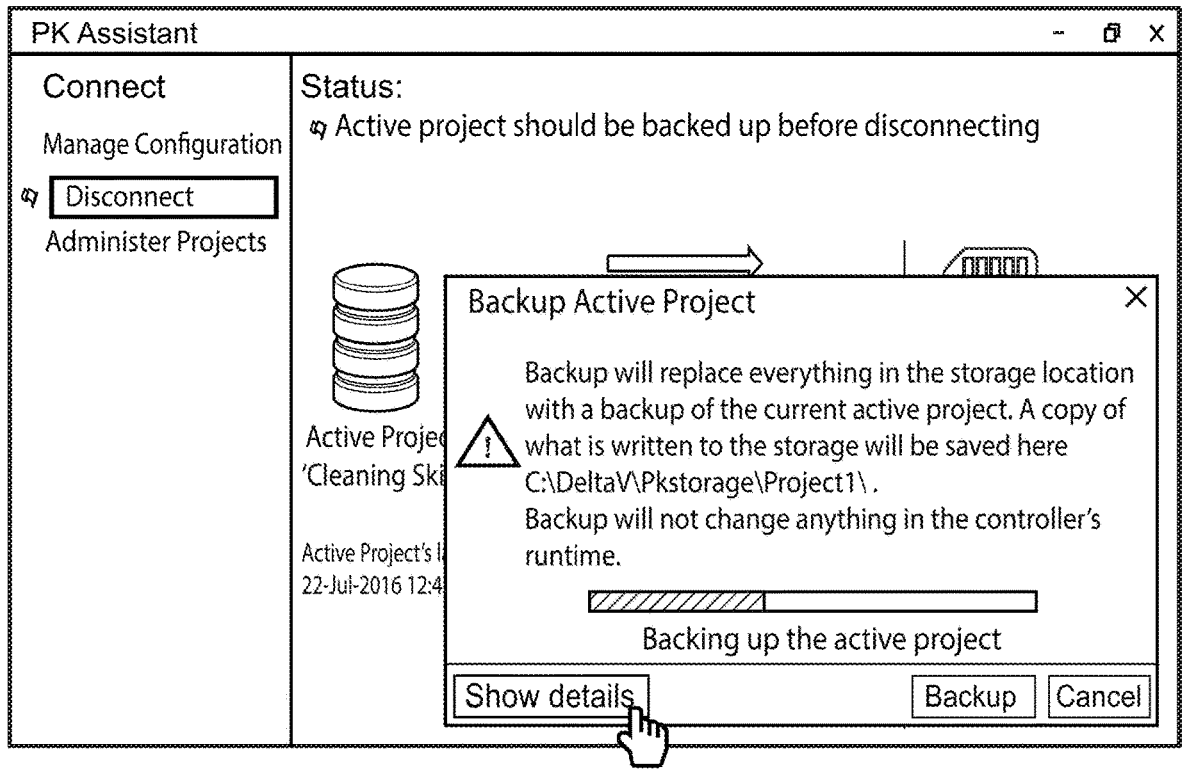
Figure 12D:
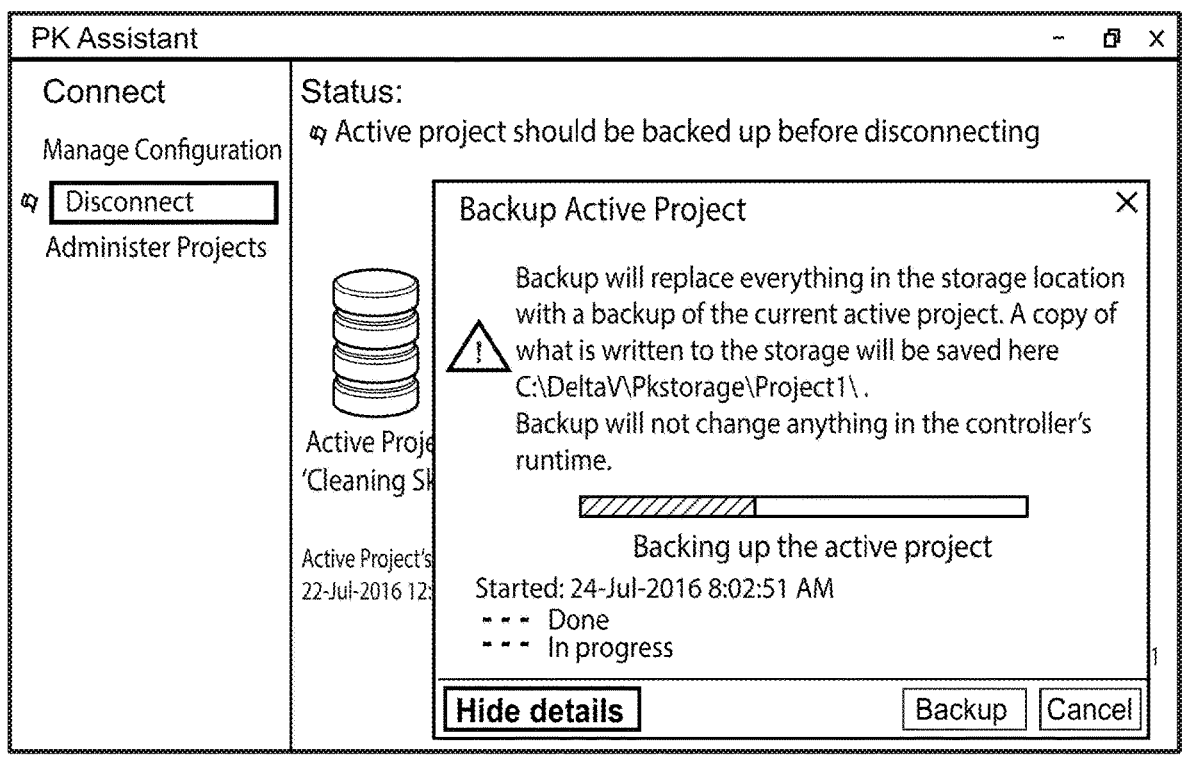
Figure 12E:
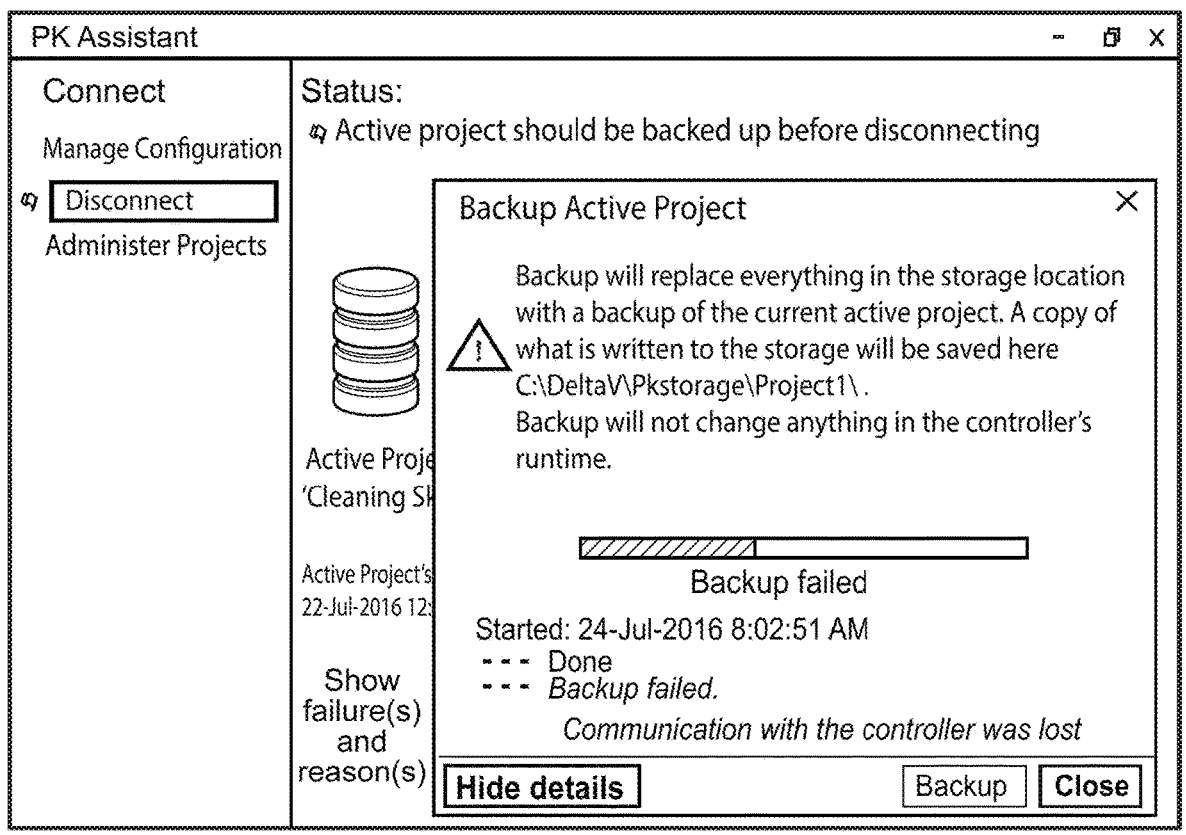

The user in another example scenario backs up the active project. The user uses a control provided by the modular assistant 50 (FIG. 12A), and the modular assistant 50 provides a warning regarding the effect of the backup (FIG. 12B). The modular assistant 50 notifies the user that the backup is in progress. Once the backup is complete, the modular assistant 50 can change the "cancel" button to "close" and disable the "backup" button (FIGS. 12C and 12D). The modular assistant 50 can notify the user of failures, if any, and the corresponding reasons (FIG. 12E).

The user sometimes may forget to back up the active project. In an example scenario, the user's portable computer is attached to a commissioned modular controller. Once the user disconnects the cable or otherwise severs the connection between the portable computer and the modular controller, the modular assistant 50 can automatically generate a notification (e.g., a pop-up window) and notify the user that the active project has not been backed up. The pop-up window can include an interactive control for directly guiding the user to the disconnect screens such as those illustrated in FIGS. 12A-E. In some implementations, the modular assistant 50 can provide a context menu option in the taskbar, for example, to allows the user to directly proceed to the disconnect screens.

Figure 13A:
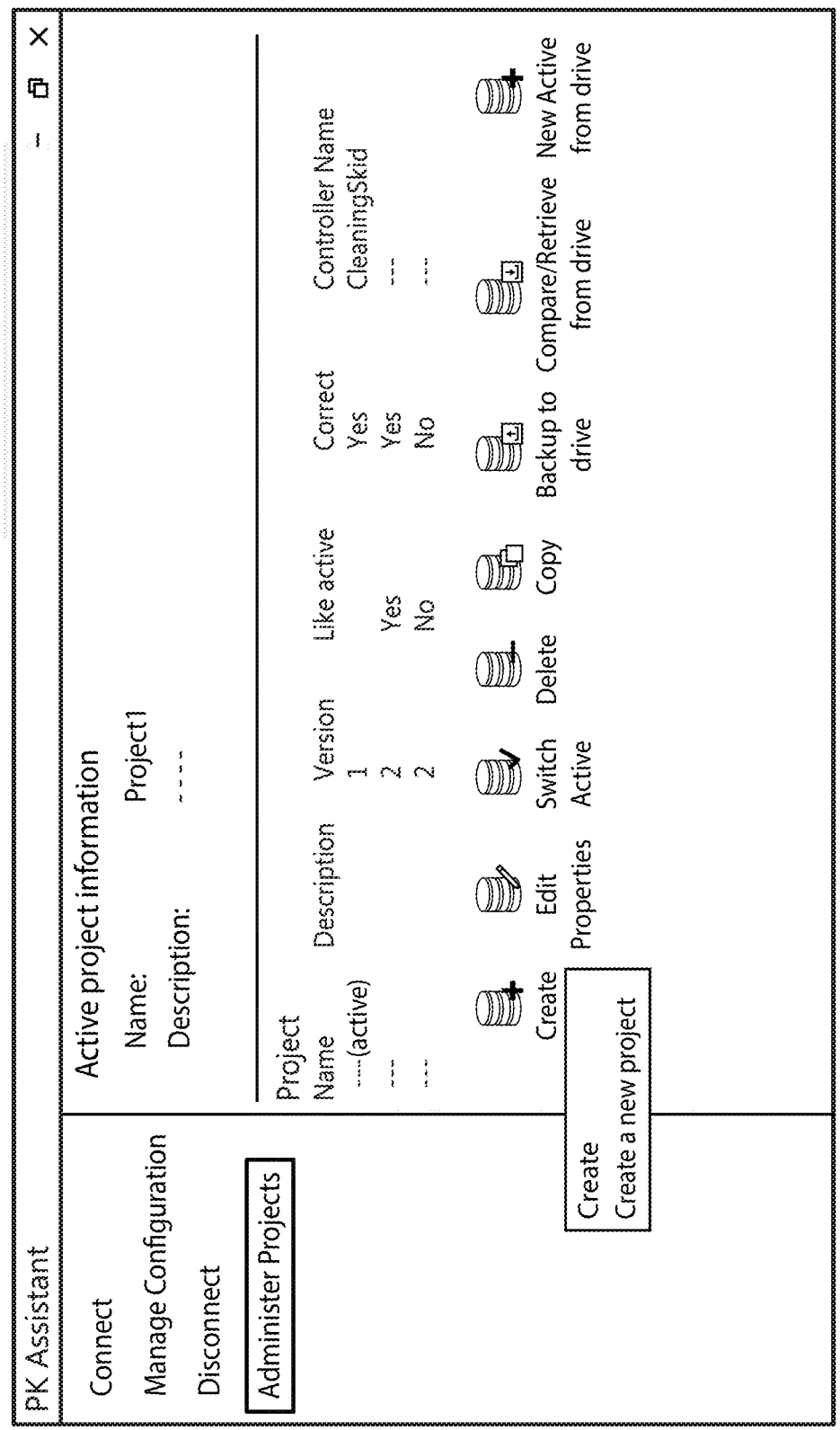
Figure 13B:
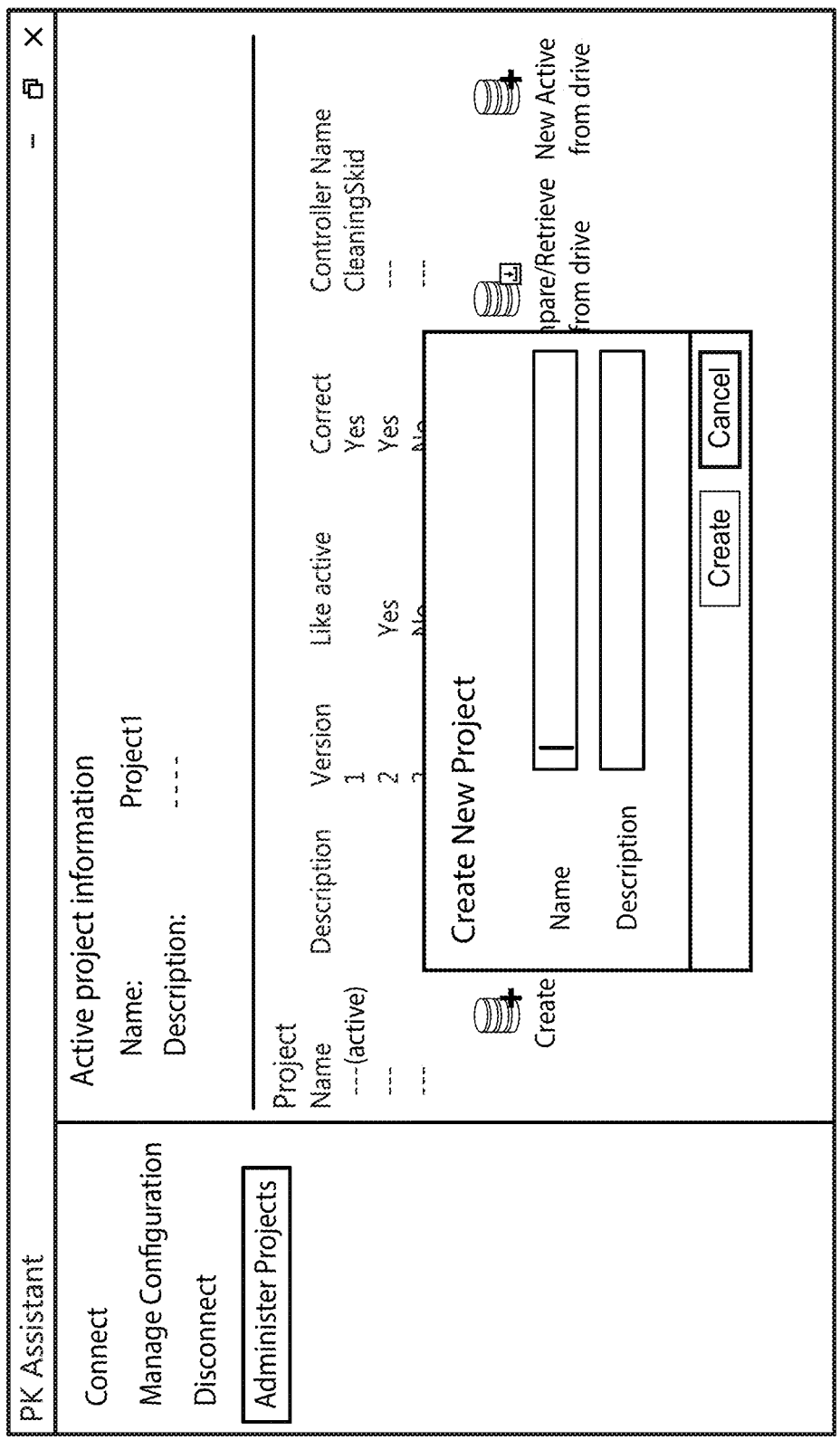

In another scenario, the user wishes to create a project. Similar to the scenario discussed above with reference to FIG. 5D, the modular assistant 50 can display "like active" and "correct" flags when the user selects the "administer projects" tab (FIG. 13A). The modular assistant 50 can prompt the user for a name of the project (FIG. 13B), receive a new project name (FIG. 13D) and create a project (FIG. 13E). In particular, the modular assistant 50 can initially disable the "create" button and enable this button only when a valid name for the project has been entered. To this end, the modular assistant 50 can apply any suitable criteria such as length, name and date restrictions, project type restrictions, etc. When the project is being created (FIG. 13D), the modular assistant 50 can disable the "cancel" and "create" buttons to avoid interruption of the process. The modular assistant 50 can change the "cancel" button to "close" upon completion (FIG. 13E).

Figure 14A:
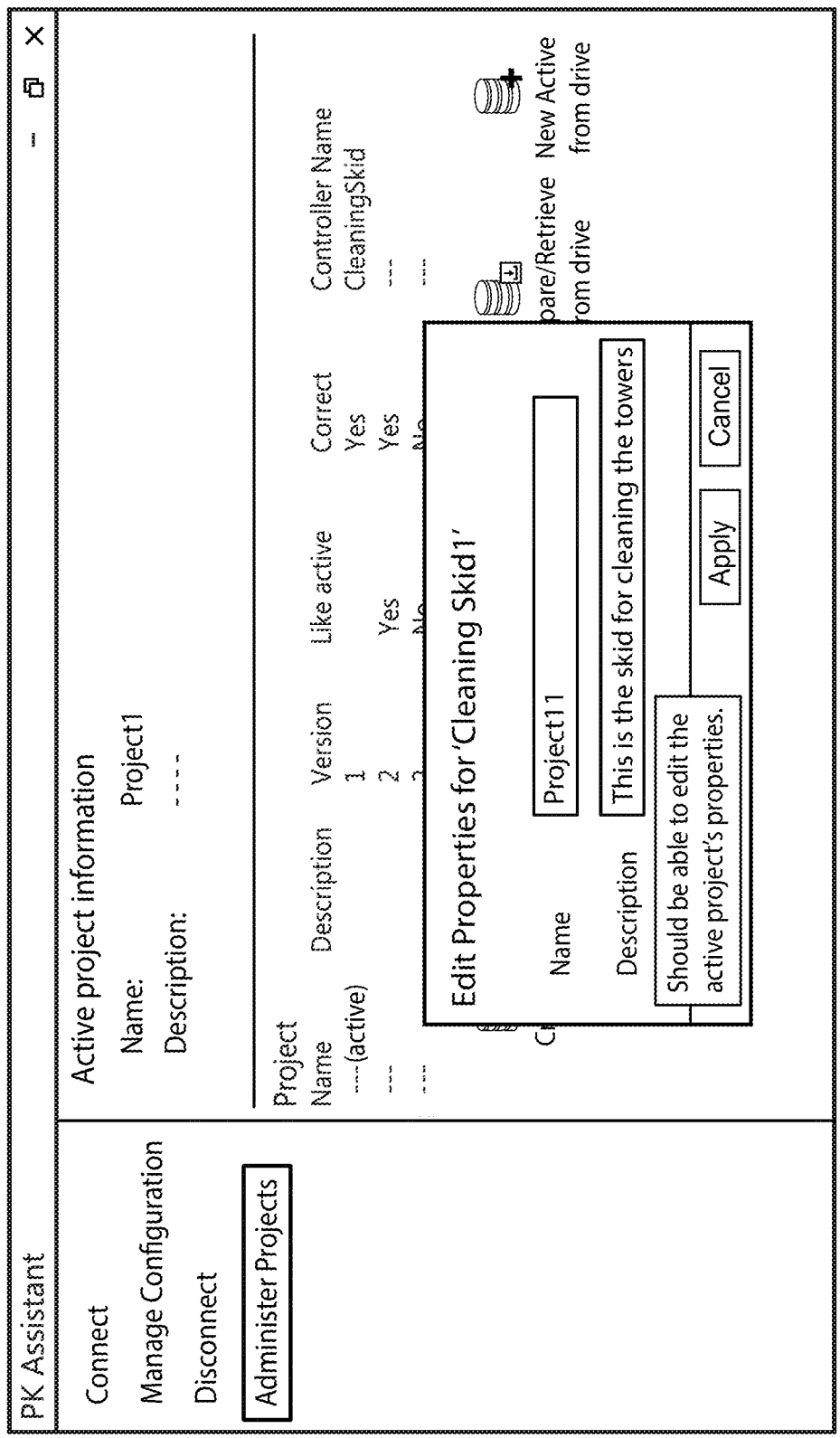
FIGS. 14A-C illustrate an example sequence of interactive screens which the assistant application of FIG. 1 can present to an operator when the operator edits properties of a project.
Figure 14B:
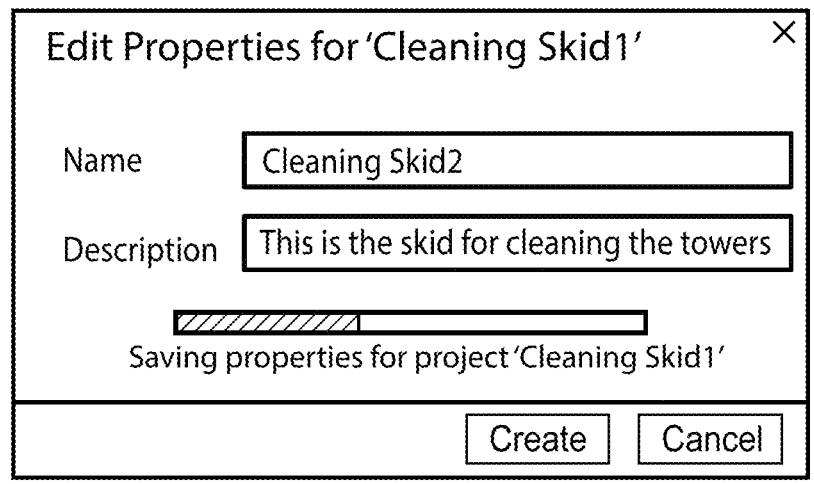
Figure 14C:
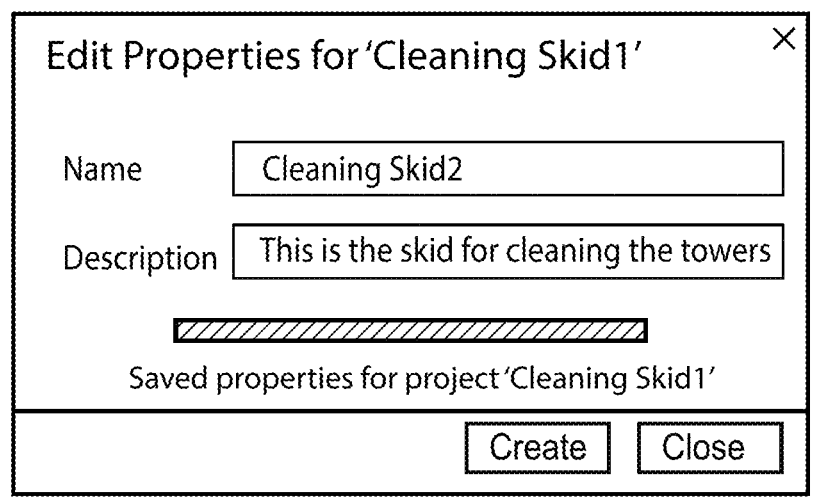

In another scenario, the user wishes to edit the properties of the project. The modular assistant 50 can user the user to edit the properties of the active project (FIG. 14A). When the user clicks "apply," the modular assistant 50 starts the operation and disables the buttons to prevent interruptions of the process (FIG. 14B). Upon completion, the modular assistant 50 can enable the buttons (FIG. 14C).

Figure 15A:
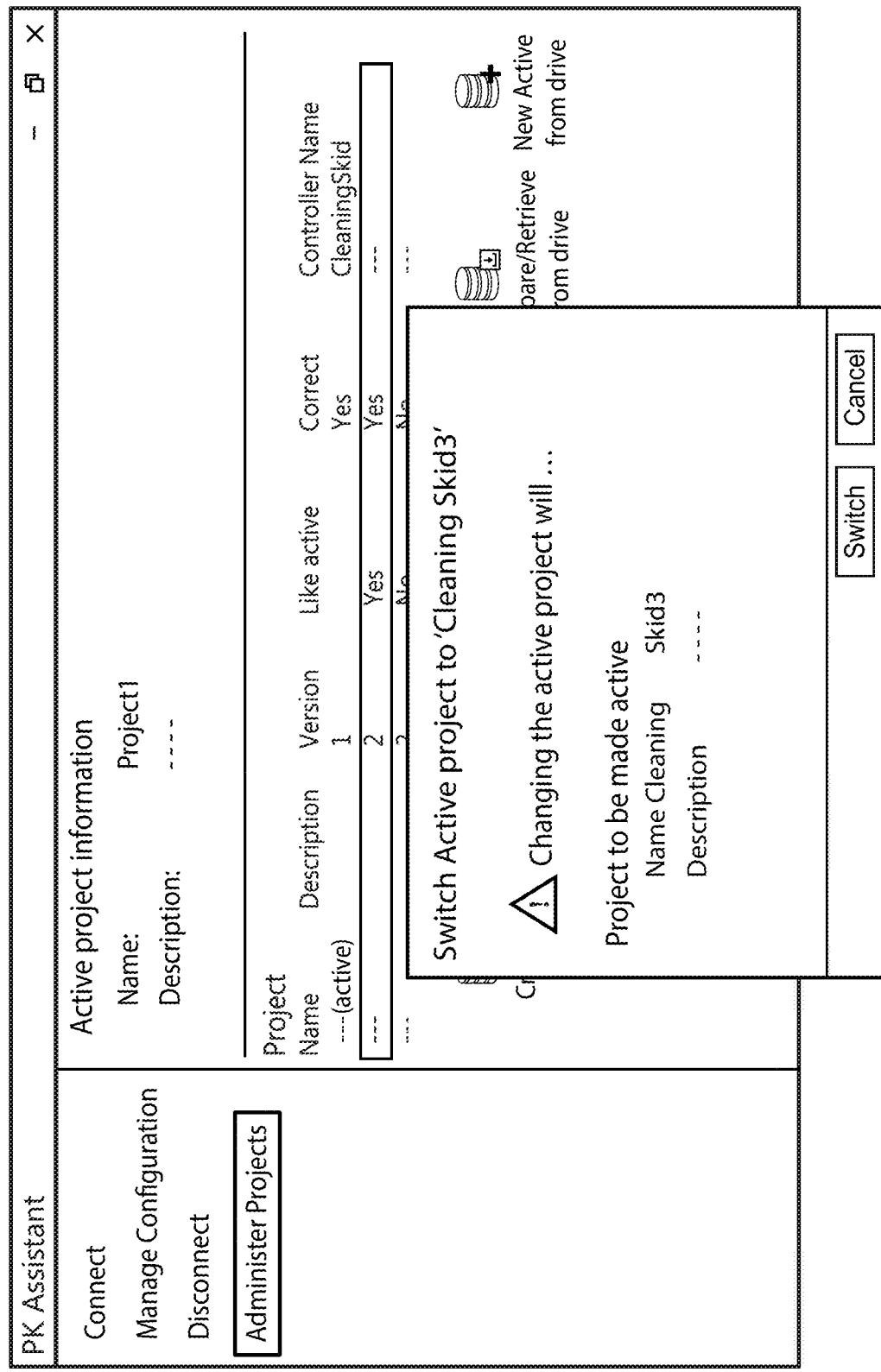
FIGS. 15A-C illustrate an example sequence of interactive screens which the assistant application of FIG. 1 can present to an operator when the operator switches active projects.
Figure 15B:
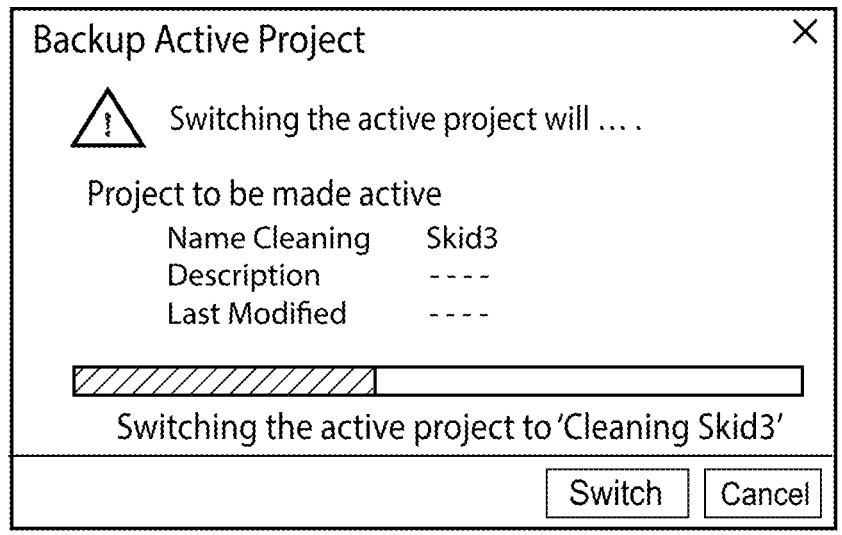
Figure 15C:
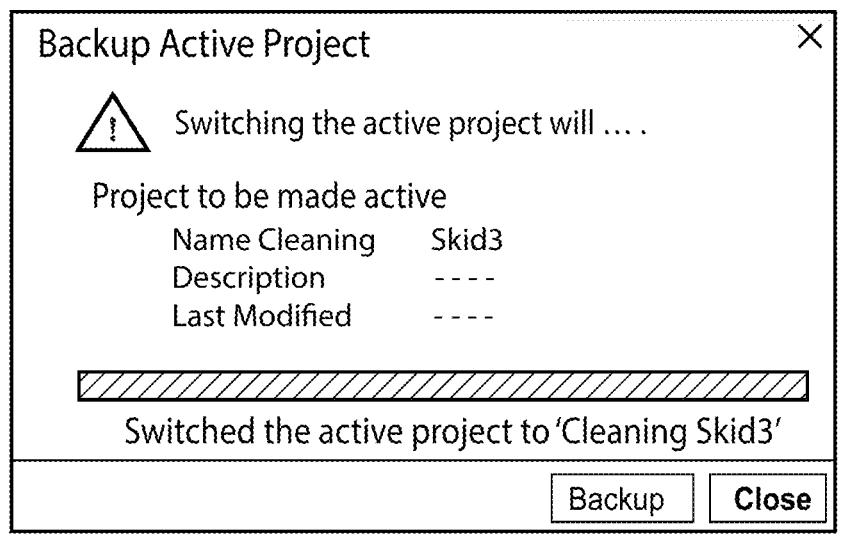

The user in another scenario switches the active project. The modular assistant 50 generates a status/warning window 450. The modular assistant 50 notifies the user of progress similar to the scenarios above (FIGS. 15B and 15C).

Figure 16A:
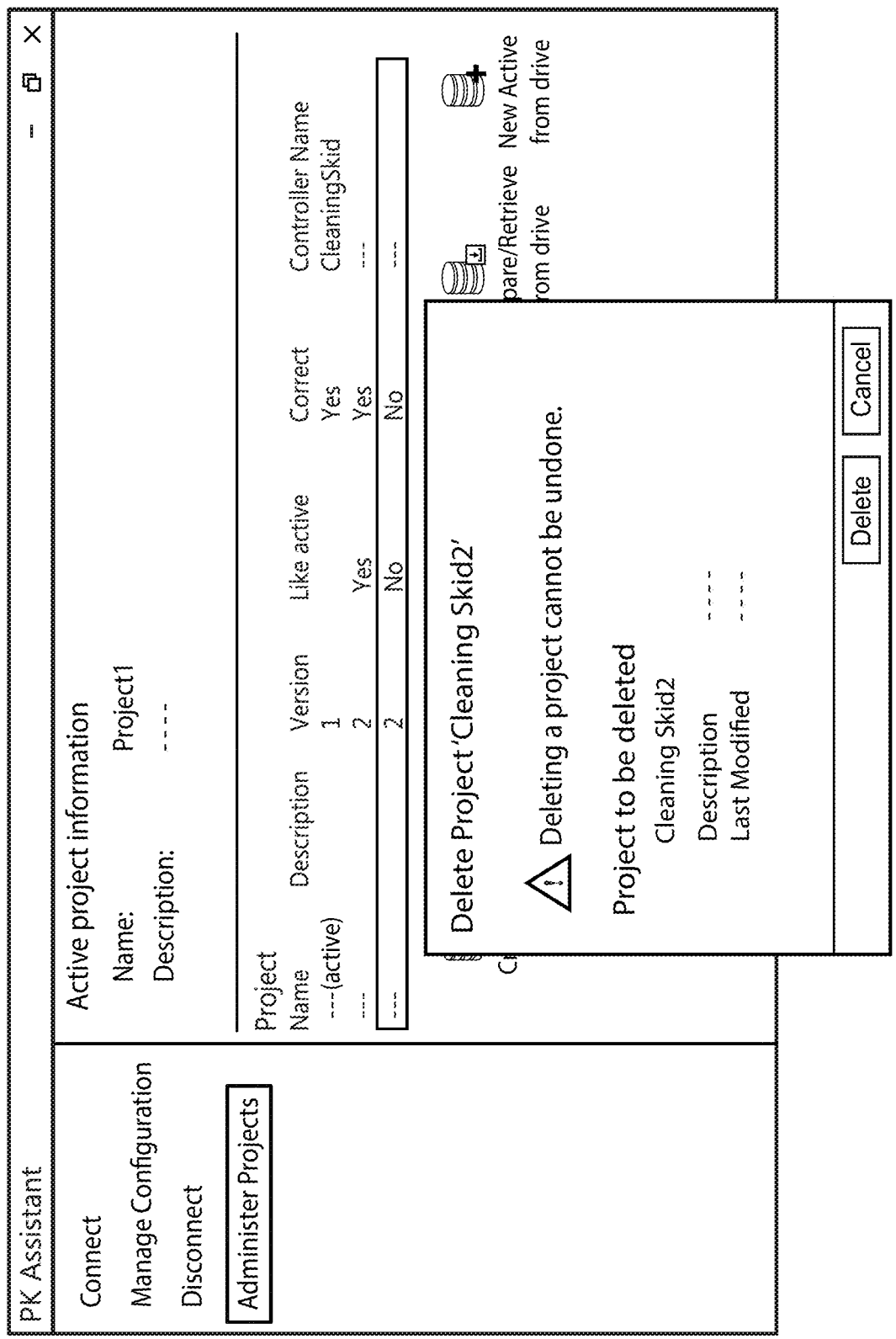
FIGS. 16A-C illustrate an example sequence of interactive screens which the assistant application of FIG. 1 can present to an operator when the operator deletes a project.
Figure 16B:
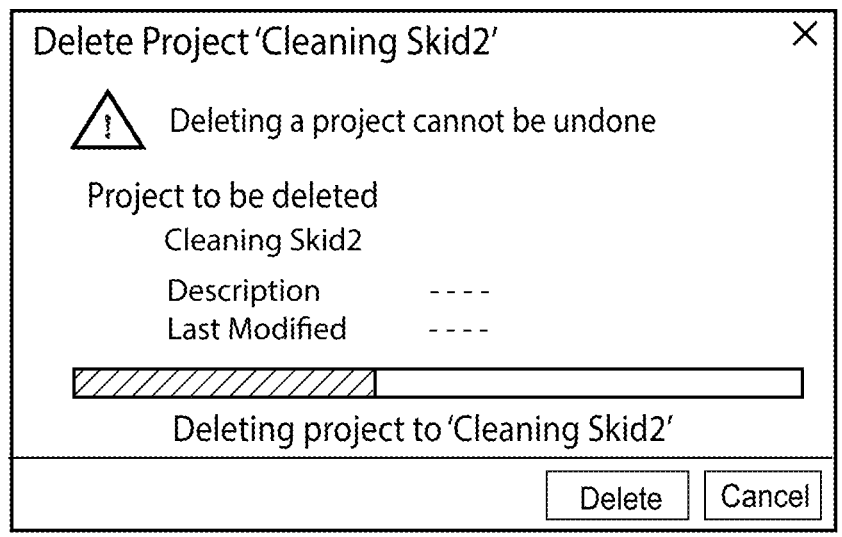
Figure 16C:
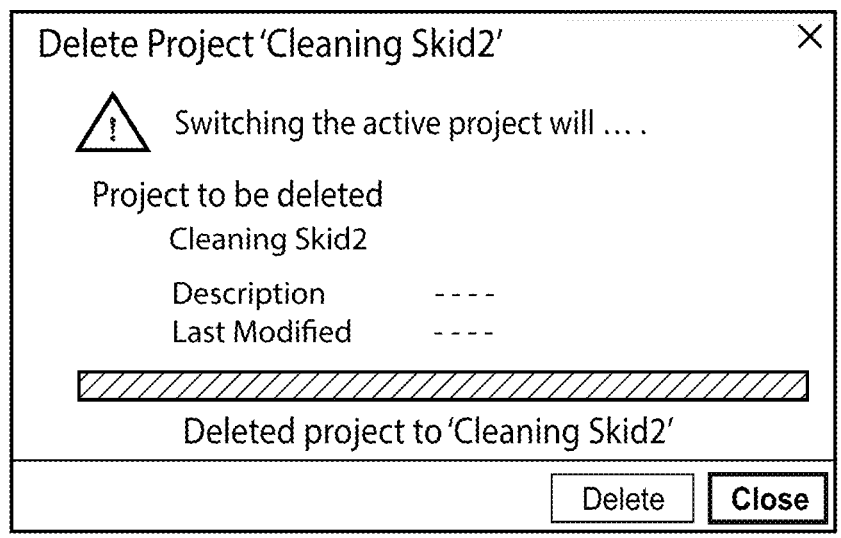

If the user wishes to delete the active project, the modular assistant 50 can generate an appropriate warning (FIG. 16A). Otherwise, the modular assistant 50 notifies the user of progress similar to the scenarios above (FIGS. 16B and 16C).

Figure 17A:
FIGS. 17A-C illustrate an example sequence of interactive screens which the assistant application of FIG. 1 can present to an operator when the operator copies a project.
Figure 17B:
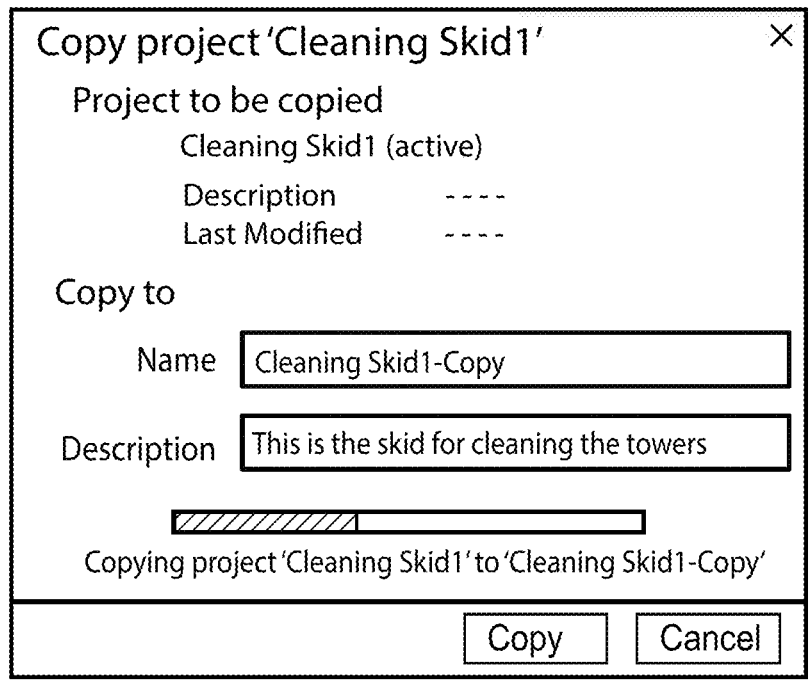
Figure 17C:
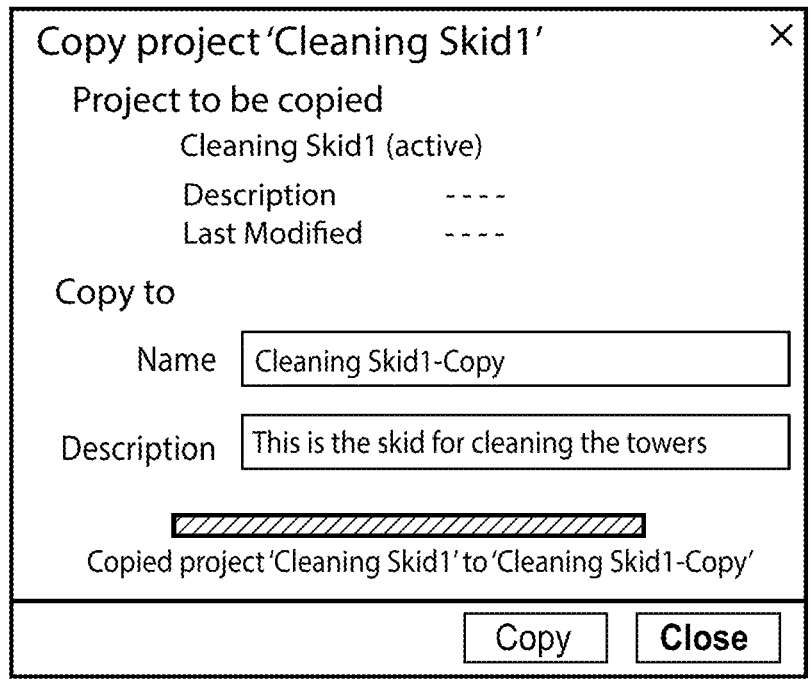

When the user wishes to copy a project, the modular assistant 50 can allow copying a non-active project (FIG. 17A). The modular assistant 50 then notifies the user of progress similar to the scenarios above (FIGS. 17B and 17C).

Figure 18:
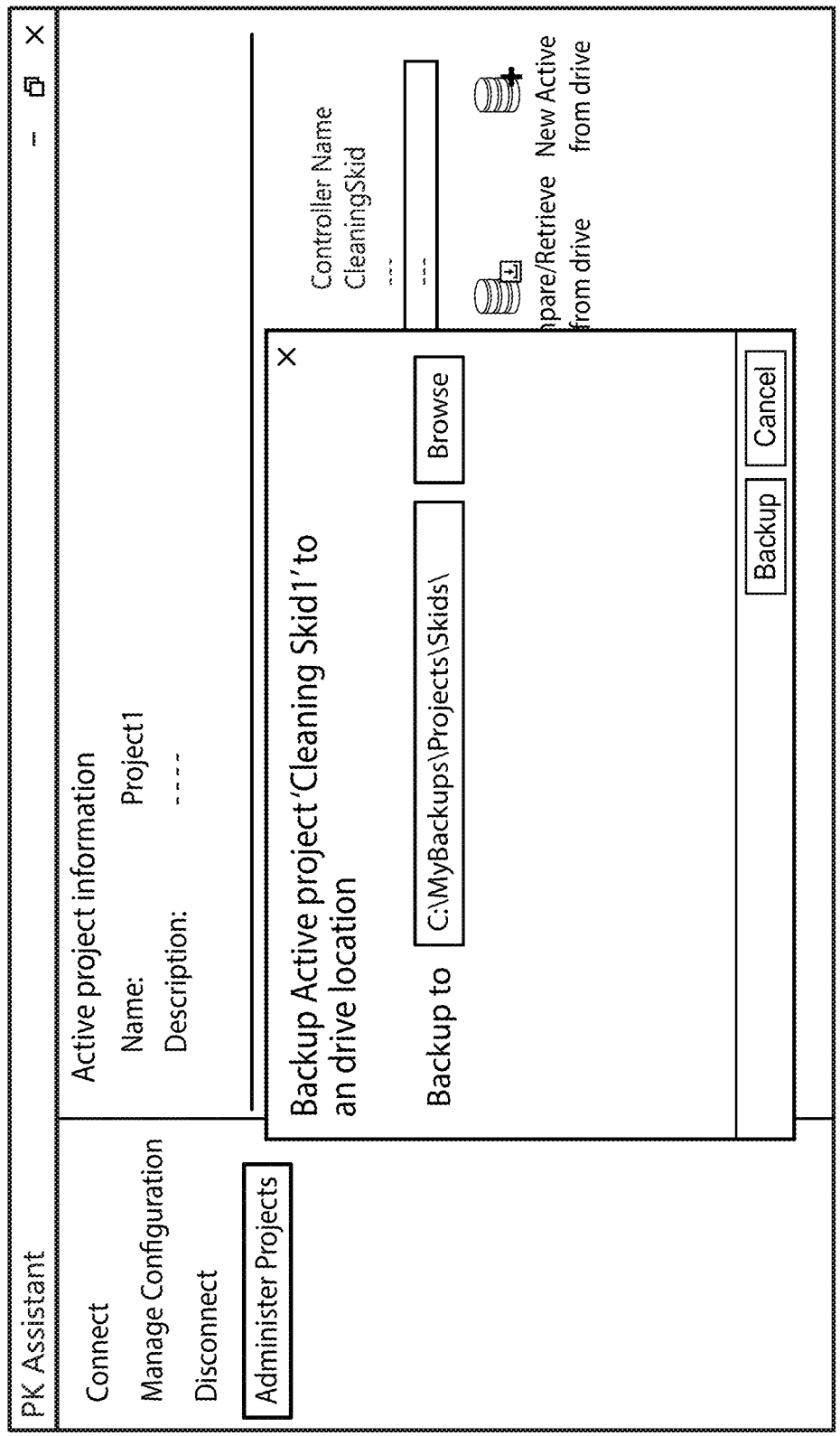
FIG. 18 illustrates an example interactive screen which the assistant application of FIG. 1 can present to an operator when the operator backs up the active project to a drive.
Figure 19:
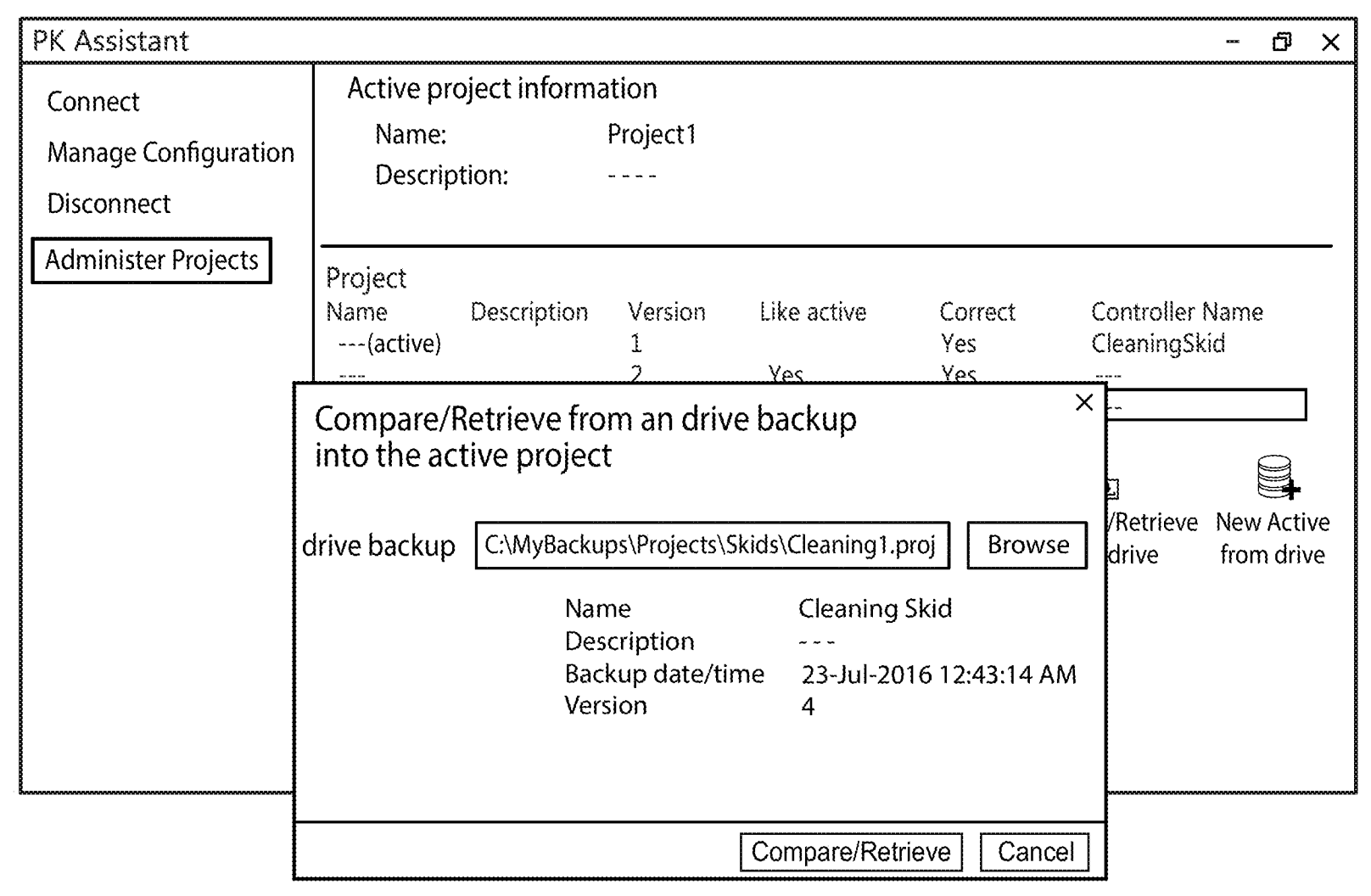
Figure 20:
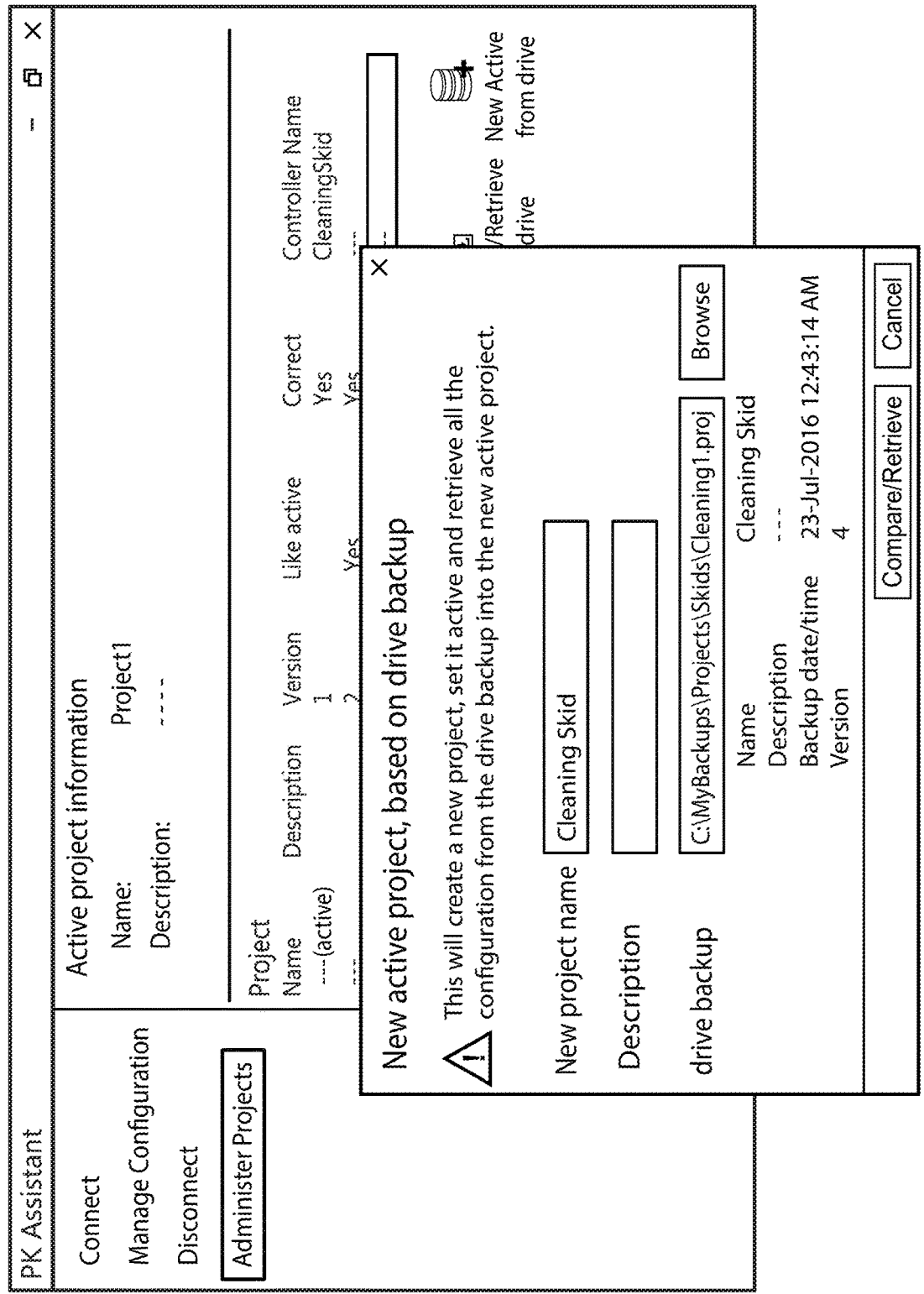
FIG. 20 illustrates an example interactive screen which the assistant application of FIG. 1 can present to an operator when the operator creates a new project from a drive.

The modular assistant 50 also can allow the user to back up the active project to a drive on the portable computer or another suitable storage (FIG. 18). When the user wishes to compare and retrieve a project from a drive, the modular assistant 50 can provide a compare/retrieve dialog (FIG. 19). When the user wishes to create a new project based on a backup in the drive, the modular assistant 50 can provide an appropriate dialogue box (FIG. 20).

In some implementations, the modular assistant 50 can require that the user communicate with the modular controller only with a dongle. When no longer is attached to the portable computer, the modular assistant 50 can deactivate certain functionality and continue providing other functionality to the user. For example, the modular assistant 50 can enable the functions in the network settings section under the "connect" tab, provide a message that the system dongle is not present in the authentication section (and disable all controls), and display only the name of the active project in the project information section. Under the "manage configurations" and "disconnect" tabs, the modular assistant 50 can display a message regarding the missing dongle and disable all controls. Under the "administer projects" tab, the modular assistant 50 can continue to provide the same functions as when the dongle was attached.

Figure 21:
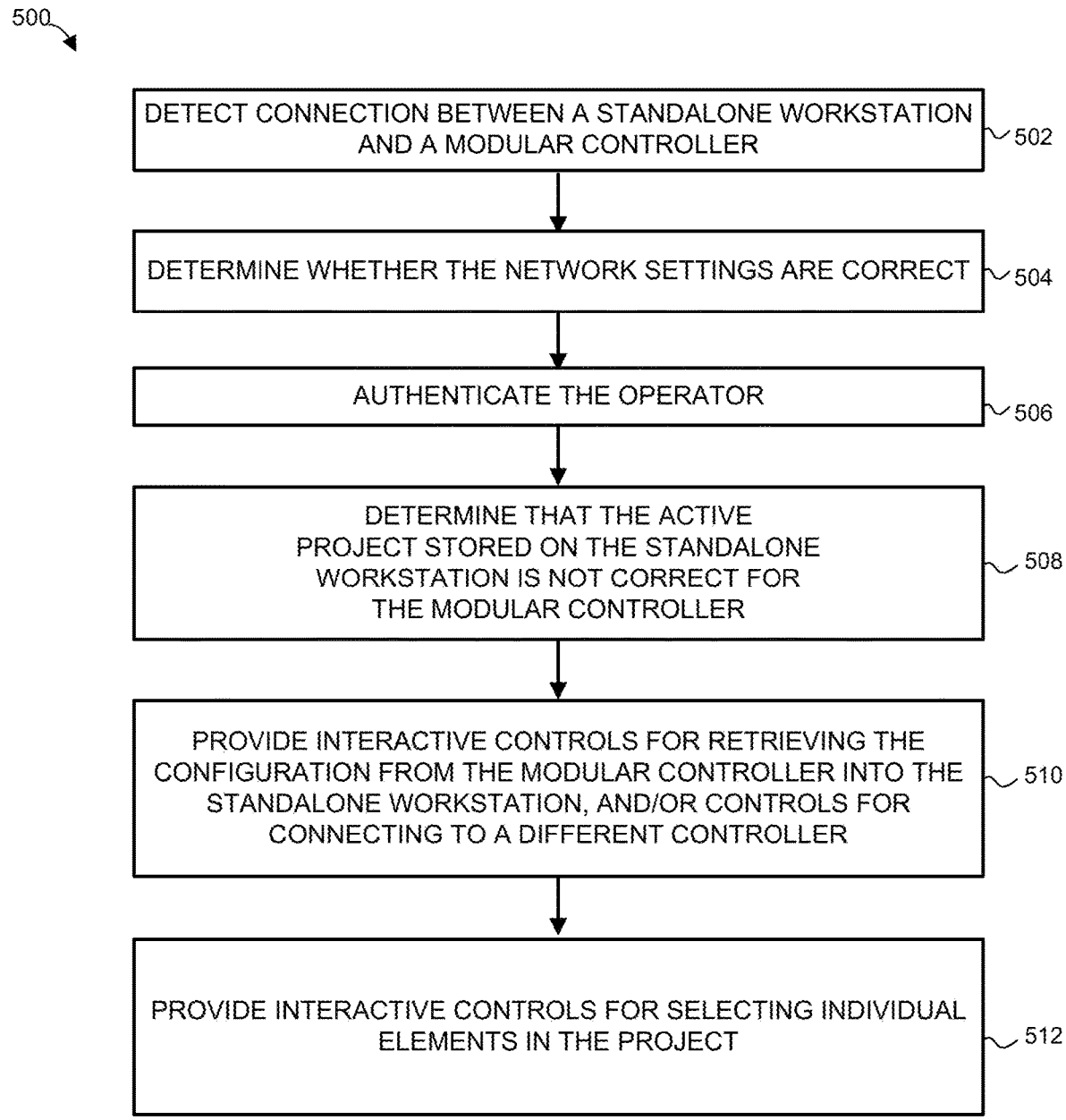
FIG. 21 is a flow diagram of an example method for efficiently managing configuration of modular control systems, which can be implemented in the system of FIG. 1.

Next, FIG. 21 depicts a flow diagram of an example method 500 for efficiently managing configuration of modular control systems. The method 500 can be implemented in the system of FIG. 1, for example. As a more specific example, the method 500 can be implemented in the modular control system assistant 50.

The method 500 begins at block 502, where a connection between a standalone workstation and a modular controller is detected. Referring to FIG. 1, for example, the modular control system assistant 50 can detect that the computer 12 is communicatively coupled to the modular controller 10. As illustrated in FIG. 5A, for example, the modular control system assistant 50 can provide a notification that a controller is attached via the user interface of the workstation.

In some cases, the modular control system assistant 50 detects a connection to the modular controller but determines that the workstation is unable to exchange information with the modular controller. For example, the network settings at the standalone workstation may prevent certain layers of the communication stack to be activated. The modular control system assistant 50 can detect whether the network settings are correct at block 504 and, when the settings are incorrect, the modular control system assistant 50 can provide an interactive screen for applying the network settings applicable to the distributed control system (see, e.g., FIG. 5). These settings can affect the IP address, the subnet mask, the default gateway, etc.

The operator can be authenticated at block 506. As illustrated in FIGS. 6A and 6B, for example, the authentication information can include login and password information.

Next, at block 508, the project stored in the memory of the standalone workstation ("active project") is compared to the project in the memory (e.g., the memory card 23) of the modular controller. To this end, any suitable file comparison technique can be used, or the modular control system assistant 50 can compare the corresponding version identifiers. For example, a substantially unique identifier can be assigned to a project upon commissioning. When the identifiers of two projects are not the same, the modular control system assistant 50 can determine that the active project is incorrect for the modular controller. When the active project is a correct one for a modular control system, the modular control system assistant 50 can allow download operations, backup operations, retrieve operations, and runtime comparisons, for example.

The modular control system assistant 50 further can determine whether the active project matches the project in the memory of the modular control system. Because an active project could have been modified without synchronizing the changes with the modular control system in which the project is commissioned, it is possible for a project that is correct for the modular system to not match the project in the modular system. The modular control system assistant 50 can determine whether the projects match by checking the metadata that specifies the type of the modular control system in which the modular controller operates, the types of components with which the modular control system is equipped, the nodes specified in the corresponding projects, etc. Thus, for example, when the active project includes configuration for a node missing from the project stored in the memory card 23, the modular control system assistant 50 can determine that the projects do not match.

If it is determined that the active project is correct for the modular controller, the modular control system assistant 50 at block 510 can provide one or more controls for retrieving the configuration from the modular controller (see FIG. 9A, for example). In some cases, only a portion of the project saved in the modular controller is merged into the active project stored in the workstation. At block 512, the modular control system assistant 50 can provide controls for selecting individual elements or items for applying to the active project. As illustrated in FIG. 9B, for example, the modular control system assistant 50 can specify names of individual items, configuration types, etc., and allow the operator to group these items based on various characteristics.

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, engines, routines, and modules described herein may be stored in any tangible, non-transitory computer readable memory such as on a magnetic disk, a laser disk, solid state memory device, molecular memory storage device, an optical disk, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the techniques of this disclosure have been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method for efficiently managing configuration of modular control systems, the method comprising:
   detecting, by one or more processors, a communicative coupling between a workstation and a modular control system in a process plant;
   in response to the detected communicative coupling, determining whether an active project stored in a memory of the workstation matches a saved project stored in a memory of the modular control system, wherein each of the active project and the saved project includes a respective coordinated set of data for controlling operation of the modular control system to perform a physical function in the process plant; and
   when the active project and the saved project do not match:
      determining, by the one or more processors, whether the active project is correct for the modular control system, and
      when the active project is incorrect for the modular control system, automatically providing, via an interactive user interface, a control for transferring at least a portion of the saved project from the memory of the modular control system to the memory of the workstation.

2. The method of claim 1, further comprising, when the active project is incorrect for the modular control system:
   preventing the workstation from saving the active project in the memory of the modular control system.

3. The method of claim 1, further comprising, when the active project is incorrect for the modular control system:
   preventing the workstation from establishing a communication session using one or more protocols of a distributed control system.

4. The method of claim 1, further comprising:
   when the active project is incorrect for the modular control system, automatically providing a control via the user interface for selecting a different active projected from among a plurality of candidate active projects stored in the memory of the workstation.

5. The method of claim 4, further comprising automatically generating a suggested name for the version retrieved from the memory of the modular control system based on a name assigned to the version stored in the memory of the modular control system.

6. The method of claim 4, further comprising, for each item in the list of items:
   providing an indication of at least one of (i) item name, (ii) item type, (iii) configuration type, and (iv) timestamp of a last edit of the item.

7. The method of claim 1, further comprising, when the active project and the saved project do not match:
   generating a list of items that conflict between the active project and the saved project, and
   providing controls via the user interface for selecting individual items in the list of items for transferring to the active project.

8. The method of claim 7, wherein the list of items is a first list of items, the method further comprising, when the active project and the saved project do not match:
   generating a second list of items included in the saved project and not included in the active project, and
   providing controls via the user interface for selecting individual items in the second list of items for transferring to the active project.

9. The method of claim 1, wherein determining whether the active project and the saved project match includes comparing, by the one or more processors, respective timestamps of the active project and the saved project.

10. The method of claim 1, further comprising:
receiving, via the user interface, a command to disconnect the workstation from the modular control system, and
in response to the command, automatically providing a control for transferring at least a portion of the active project to the memory of the workstation as a new version of the saved project.

11. The method of claim 1, further comprising:
providing a first control for transferring at least a portion of the active project to the memory of the workstation as a new version of the saved project, and
providing a second control for deploying the active project stored in the memory of the modular control system so that the modular control system begins to operate in accordance with the data in the saved project.

12. The method of claim 1, further comprising:
in response to the detected communicative coupling:
automatically requesting, via the user interface, authentication information for accessing the modular control system, and
preventing access to the modular control systems when the authentication information is incorrect.

13. The method of claim 1, further comprising:
in response to the detected communicative coupling:
determining whether network settings for the workstation are correct, and when the network settings for the workstation are incorrect, providing an interactive control for applying corrected network settings.

14. The method of claim 1, wherein providing the control for transferring at least a portion of the saved project from the memory of the modular control system to the memory of the workstation includes providing a control for retrieving an entirety of the saved project from the memory of the modular control system into a new active project to be stored in the memory of the workstation.

15. The method of claim 1, wherein the determining whether the active project matches the saved project comprises comparing process equipment or nodes respectively defined by the active project and saved project to perform the physical function.

16. A computing device comprising:
one or more processors;
a user interface;
an interface to communicatively couple the computing device to a modular control system in a process plant; and
a non-transitory memory storing thereon (i) at least one active project that includes a coordinated set of data for controlling operation of the modular control system to perform a physical function in the process plant, and (ii) instructions that, when executed by the one or more processors, implement a modular control system assistant configured to:
detect a communicative coupling between the computing device and the modular control system,
determine whether the active project matches a saved project stored in a memory of the modular control system, and
when the active project and the saved project do not match:
determine whether the active project is correct for the modular control system, and
when the active project is incorrect for the modular control system, automatically provide, via the user interface, a control for transferring at least a portion of the saved project from the memory of the modular control system to the memory of the computing device.

17. The computing device of claim 16, wherein the modular control system assistant is further configured to:
when the active project is incorrect for the modular control system, automatically provide a control via the user interface for selecting a different active projected from among a plurality of candidate active projects stored in the memory of the computing device.

18. The computing device of claim 17, wherein the modular control system assistant is further configured to:
automatically generate a suggested name for the version retrieved from the memory of the modular control system based on a name assigned to the version stored in the memory of the modular control system.

19. The computing device of claim 16, wherein the modular control system assistant is further configured to, when the active project and the saved project do not match:
generate a list of items that conflict between the active project and the saved project, and
provide controls via the user interface for selecting individual items in the list of items for transferring to the active project.

20. The computing device of claim 19, wherein the list of items is a first list of items, the modular control system further configured to, when the active project and the saved project do not match:
generate a second list of items included in the saved project and not included in the active project, and
provide controls via the user interface for selecting individual items in the second list of items for transferring to the active project.

21. The computing device of claim 20, wherein the modular control system is further configured to, for each item in the list of items:
provide an indication of at least one of (i) item name, (ii) item type, (iii) configuration type, and (iv) timestamp of a last edit of the item.

22. The computing device of claim 20 implemented as a portable standalone computer storing a plurality of projects for multiple modular control systems.

23. The computing device of claim 16, wherein the determining whether the active project matches the saved project is based at least upon a comparison of process equipment or nodes respectively defined by the active project and the saved project to perform the physical function.

24. A system comprising:
a modular control system including:
a modular controller that implements control logic of the modular control system, wherein the controller is built natively on a platform of a distributed control system,
equipment configured to perform a physical function in a process plant according to the control logic, and
a memory storing a saved project that includes a coordinated set of data for controlling operation of the modular control system; and
a standalone workstation including:
one or more processors,
a user interface,
an interface to communicatively couple the standalone workstation to the modular control system, and
a non-transitory memory storing thereon (i) at least one active project and (ii) instructions that, when executed by the one or more processors, implement a modular control system assistant configured to synchronize data between at the at least one active project in the memory of the standalone workstation and the saved project in the memory of the modular controls system.

25. The system of claim 24, wherein the memory of the modular control system is a removable memory card.

\* \* \* \* \*